(12) United States Patent
Erlendsson

(10) Patent No.: US 12,248,194 B2
(45) Date of Patent: Mar. 11, 2025

(54) HIGH STRENGTH DATA TRANSMISSION CABLE

(71) Applicant: HAMPIDJAN HF., Reykjavik (IS)

(72) Inventor: Hjortur Erlendsson, Kopavogur (IS)

(73) Assignee: HAMPIDJAN HF, Reykjavik (IS)

( * ) Notice: Subject to any disclaimer, the term of this patent is extended or adjusted under 35 U.S.C. 154(b) by 393 days.

(21) Appl. No.: 17/437,061

(22) PCT Filed: Mar. 13, 2020

(86) PCT No.: PCT/IS2020/050008
§ 371 (c)(1),
(2) Date: Sep. 8, 2021

(87) PCT Pub. No.: WO2020/188605
PCT Pub. Date: Sep. 24, 2020

(65) Prior Publication Data
US 2022/0163748 A1    May 26, 2022

Related U.S. Application Data

(60) Provisional application No. 62/914,477, filed on Oct. 13, 2019, provisional application No. 62/819,474, filed on Mar. 15, 2019.

(51) Int. Cl.
| | |
|---|---|
| *G02B 6/44* | (2006.01) |
| *H01B 7/04* | (2006.01) |
| *H01B 7/18* | (2006.01) |
| *H01B 11/22* | (2006.01) |
| *H01B 13/06* | (2006.01) |

(52) U.S. Cl.
CPC ....... *G02B 6/44384* (2023.05); *G02B 6/4486* (2013.01); *H01B 7/04* (2013.01); *H01B 7/183* (2013.01); *H01B 11/22* (2013.01); *H01B 13/06* (2013.01)

(58) Field of Classification Search
CPC .............................. G02B 6/4486; H01B 11/22
See application file for complete search history.

(56) References Cited

U.S. PATENT DOCUMENTS

| | | | | |
|---|---|---|---|---|
| 2014/0216782 A1* | 8/2014 | Erlendsson | ............ | H01B 13/32 29/825 |
| 2022/0120984 A1* | 4/2022 | Erlendsson | ............ | D07B 1/147 |

* cited by examiner

*Primary Examiner* — Chad H Smith
(74) *Attorney, Agent, or Firm* — Tarolli, Sundheim, Covell & Tummino LLP

(57) ABSTRACT

Disclosed is a non-steel high strength data transmission cable having a strength member (5) and a core (1). The high strength data transmission cable includes a length of a core-cable (10), the length of core-cable (10) includes core (1) plus at least one fiber-optic conductor (2) that is:
   (i) disposed in a helical shape; and
   (ii) completely encased in a solid, flexible material.
Also disclosed is a process for making a high strength data transmission cable. The high strength data transmission cable is capable of being wound on a winch under tensions and surging shocks experienced by a fishing trawler, and provides high quality data signal transmission and resolution so as to permit use for transmitting data during fish trawl operation from high-resolution sonars used to monitor fish caught.

10 Claims, 12 Drawing Sheets

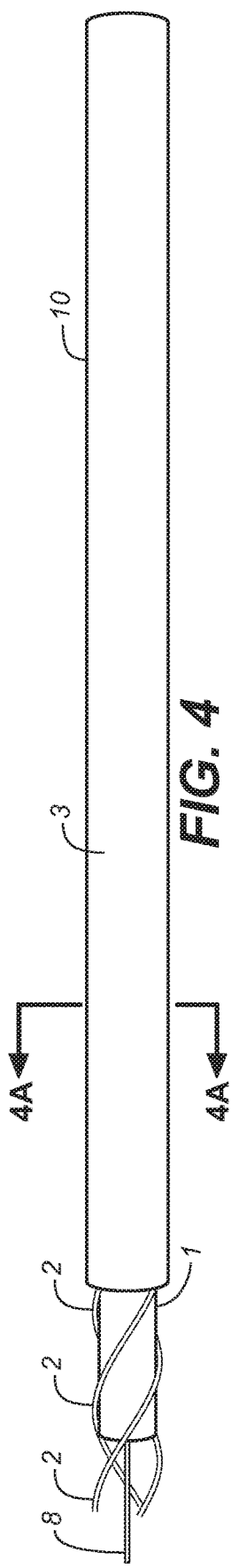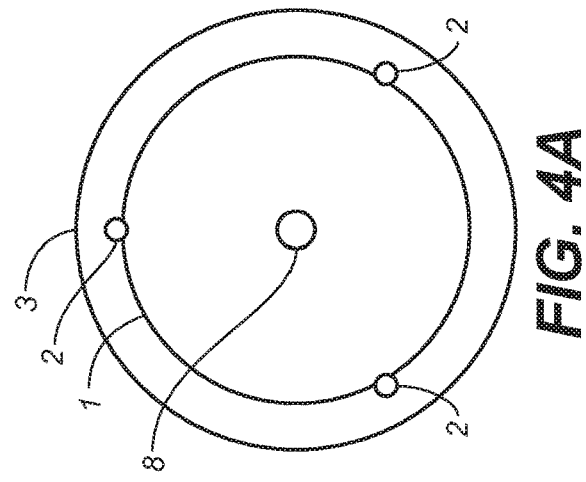
FIG. 4
FIG. 4A

HIGH STRENGTH DATA TRANSMISSION CABLE

This patent application claims priority under 35 U.S.C. § 371 from Published Patent Cooperation Treaty ("PCT") Patent Application no. WO 20201/88605 A1, PCT International Patent Application no. PCT/IS2020/050008, filed 13 Mar. 2020, which PCT International Patent Application claims priority both from:
1. U.S. Provisional Patent Application No. 62/819,474 filed with the United States Patent and Trademark Office ("USPTO") on 15 Mar. 2019; and
2. U.S. Provisional Patent Application No. 62/914,477 filed with the USPTO on 13 Oct. 2019.

TECHNICAL FIELD

The present disclosure relates generally to the technical field of cables and, more particularly, to a cable that is made from a synthetic polymeric material, that exhibits high stiffness and breaking strength, and that includes data signal and/or energy conductors therein.

BACKGROUND ART

It has become increasingly important to reduce the weight of cables while also being able to avoid dangerous recoil events that happen when wire ropes/cables rupture during use. It is a problem in that lighter weight, recoil less or low recoil cables are made from synthetic strength members that although being light in weight in comparison to steel wire rope cables and stronger or as strong as steel wire rope cables, have failed to adequately protect fiber optic information conductors contained within the cable. For this reason, steel wire rope cables continue to be used in many applications requiring the deployment of fiber optic conductors within a cable, and the problem of dangerous recoil continues to present harm to operators and crew.

Other problems posed by the inclusion of fiber optic cables within steel wire rope cables is that in certain applications the steel wire rope cables are too heavy to function adequately, and thus are unable to be deployed. This has hindered the adoption into industry of advanced equipment and technology that can be used to, for example, increase the resolution of data transmitted along such cables so as to be able to prevent environmental harm in real time from equipment operating remotely, that is very important in undersea applications in both the oil and gas industry, where proper positioning and operation of equipment at deep depths requires a high degree of accuracy that in turn requires a high quality of data transmission in order to best prevent accidents that cause environmental harm. In other applications, high quality data transmission is required in order to operate equipment that protects marine mammals from harm, as well as to protect non target fish from being inadvertently captured in fishing operations that must catch only specific fish determined by usually government agencies responsible for ensuring the conservation of fish stocks at a sustainable use level. This also is highly important for marine mammals, sea birds and other fish as any fish inadvertently caught reduces the food supply for these important creatures.

For example, a towed trawl usually includes a headline sonar sensor for monitoring the trawl's opening and fish schools in front of the trawl. A data transmission cable, i.e. a headline sonar cable that is sometimes called a third wire, includes a conductor for transferring data signals from the headline sonar sensor to the towing vessel. It is extremely important to the health of both commercial fisheries as well as to the health of marine mammals and seabirds that depend upon healthy fish stocks that technology be developed and adopted that permits readily identifying and differentiating between different fish species and between adult and juvenile fish. Fish tend to school according both to their age group, e.g. adults and juveniles school in different and distinct schools, and according to their species, i.e. salmons, pollock and herring all school independent of one another. However, with present technology, it is not possible to accurately differentiate between different age groups of fish of the same species, nor does present technology permit reliably differentiating between different species when such species are mingled in a general region. As a result, juvenile and undersized fish continue to be caught in large quantities even though they are not targeted, and as a result as well, non-target species tend to be caught in large quantities even when there is no economic benefit to catching them.

To explain about how a fish species is incidentally caught even when there is no economic benefit to doing so: For example, when fishing for Alaskan Pollock, it is very common for the Alaskan Pollock fishing fleet to accidentally catch many thousands of tons of non-target species such as herring, salmon, squid, and other. Some of these non-target species are discarded by law, such as with the salmon or herring, the idea being that no one should financially benefit from catching non-target fish. This policy developed as a result of conflict between native persons and other shore-based salmon and herring fishing entities, and modern high-seas fishing fleets. Thus, the salmon and herring caught in Alaskan waters by high-seas fishing fleets are counted by government authorities, then taken out to sea, and discarded by being dumped overboard. Or, such as in the case of squid, sold at a low price. Similar situations exist in most other fishing regions. Also, with prior technology, schools of juvenile fish such as Pollock as well as other fish cannot be readily differentiated from schools of adult fish. Thus, many thousands of tons of juvenile fish are killed even though they are too small for fillets and are only used in making fish meal, that is a shame.

Thus, it can readily be appreciated that it is important to protect from unintentional catch non-target fish species, juvenile and undersized fish. In order to accomplish this goal, it is needed to identify the composition of fish schools identified and targeted by fishing vessels, such as by mid water/pelagic trawlers at the location of the fishing gear itself. For example, due to the fact that the position during fishing operations of a midwater/pelagic trawl is far removed from the trawler, and can be more than half a kilometer removed from the trawler, and because of side currents and different flow directions between surface currents acting on the trawler and lower level currents deeper in the water column acting on the trawl itself, the position of the trawl most often is not in line with the orientation of the trawler pulling the trawl. For this reason, the sonar equipment aboard the trawling vessel does not permit accurately identifying what fish schools are directly in the path of the opening of trawl net itself. This can only be identified by a sonar unit located directly on the trawl net itself. Therefore, if non target fish species and juvenile fish are to be protected and not caught, it is necessary that the sonar located on the trawl itself be capable of identifying the difference between fish species, juvenile and undersized fish, and, what is more, transmitting that information to the trawling vessel. Different entities are presently working on technology for such sonars and it is safe to say that sufficient technological advancement has occurred that it is possible with known technology to create a sonar that can accurately distinguish between different fish species as well as between juvenile and adult fish. Use of such equipment on the headline sonar of a trawl net, for example, would permit the trawling vessel operator to discern, and thus to avoid placing the trawl net opening in the path of, juvenile and non-target fish species.

Problematically, none of the known art has provided a headline sonar cable that is capable of transmitting a sufficiently high-quality data signal to permit use of very high-resolution sonars that are able to distinguish between different fish species and between juvenile and undersized fish. Therefore, even if it is possible to create a sonar that is capable of doing so, it remains impossible to use the sonar, because it is not possible to transmit with known headline sonar cables across the distances existing between a headline sonar and a trawling vessel a signal of sufficiently high resolution to benefit from use of such high resolution information. The inability to actually use such equipment is, obviously, stalling the development of such equipment. Thus, it can be understood that a long felt need exists in the industry for a headline sonar cable capable of transmitting a sufficiently high data signal that permits use of equipment that is capable of discerning between fish of different species and between adult and juvenile fish so as to permit avoiding catching non target and juvenile fish.

Presently, traditional strength members of conventional headline sonar cables are made from steel, and enclose a central metallic conductor that is surrounded by layered, multi-layered and torsion balanced, or braided copper wires. The braided copper wires surrounding the central conductor shield the data signal carried on the central copper conductor from electromagnetic interference that degrades the quality of transmitted data signals. Headline sonar cables can be up to 4000 meters long and, besides their main function of transferring data signals, the cable is also sometimes used to increase trawl's opening by raising the headline. This is why a headline sonar cable is sometimes called a third wire.

When used with a trawl, a headline sonar cable must absorb the stress that results from the trawler's surging on sea swells. Surging causes the stern of the trawler where the third wire winch is located to impart surging shocks to the headline sonar cable being deployed therefrom. Surging significantly increases compressive force applied to the headline sonar cable at the winch thereby correspondingly increasing the likelihood that the headline sonar cable's data signal conductor may become damaged.

One disadvantage of a conventional steel headline sonar cable is its weight. The weight of a steel headline sonar cable adversely affects trawl operation and fishing gear's performance. A long steel headline sonar cable extending between a trawler and a trawl will, between the trawler the headline sonar, descend below the trawl's headline. Furthermore, a trawler's headline sonar cable winch frequently lacks sufficient power to tense the steel headline sonar cable since the winch is supporting the cable's weight.

A steel headline sonar cable that descends below the trawl's headline necessarily passes through schools of fish that are in front of the trawl's opening. Passage of the steel headline sonar cable through a school scares the fish and the school will turn sideways. A schools' sideways turn may reduce the catch because some of the fish avoid the trawl's opening.

Another disadvantage of a steel headline sonar cable occurs if the cable breaks. A broken steel headline sonar cable, due to its weight, initially falls downward and then starts cutting through and damaging the trawl. Similarly, when the trawler turns while towing a trawl it often becomes difficult to control a steel headline sonar cable to avoid contact between the cable and the trawl's warp lines and/or the bridles. Contact between the headline sonar cable and the trawl's warp lines and/or bridles can damage either or both the headline sonar cable and the trawl's warp lines and/or bridles. Similarly, sometimes a headline sonar cable contacts a trawl door. Contact between a headline sonar cable and a trawl's door can result either in the cable being cut, or the cable becoming entangled with the door so the trawl door become uncontrollable. Curing any of the preceding problems associated with the use of a steel headline sonar cable requires retrieving, repairing and/or readjusting the fishing gear.

Over time rust also degrades a steel headline sonar cable. Furthermore, steel headline sonar cables are difficult to splice because they typically consist of two twisted layers of steel wires, one layer twisted clockwise and the layer other counterclockwise.

Cables made from synthetic polymeric materials exhibit rather different physical properties compared to conductors, e.g. optical fibers and wires made from copper, aluminum or other metals. In general, the elasticity of conductors is very low while synthetic polymeric materials generally exhibit greater inherent elasticity. Twisting stranding and/or braiding fibers and/or filaments of synthetic polymeric materials into a cable further increases elasticity of the finished cable due to voids that occur between fibers and/or filaments. A straight conductor oriented parallel to or inside a cable made from synthetic polymeric materials tends to break upon an initial application of tension which stretches the cable. The constructional elasticity of cables made from synthetic polymeric materials can be reduced by stretching the cable either while it is hot or cold. Stretching a cable made from synthetic polymeric materials reduces elasticity by compressing the fibers and/or filaments while also removing voids.

Fibers and/or filaments made from ultra-high strength synthetic polymeric materials like Ultra High Molecular Weight Polyethylene ("UHMWPE"), HMPE, Kevlar™. and Twaron™; carbon fibers; aromatic polyester, e.g. Vectran™; thermoset polyurethane. e.g. Zylon™; and aromatic copolyamid, e.g. Technora™; typically have elongation to break from 2-10%. A cable made from such materials generally exhibit 2-5% constructional elongation. If a conductor is placed inside or with a cable made from such a synthetic polymeric material it must be able to accept this elongation without either breaking or becoming brittle which ultimately results in premature conductor failure.

Tension bearing energy and data signal cables using synthetic fibers for a strength member are known. For example, Cortland Cable Company offers such cables for seismic/magnetometer tow cables, side-scan sonar and video tow cables and seismic ocean bottom cables. Such cables when used for tethering a remotely operated vehicle ("ROV") operate at low tension and insignificant surge. Strong surge shocks are unusual for current applications of ROV tether lines and moored ocean cables or the other uses for known non-steel tension bearing energy and data signal cables. In fact, it is well known in the field that ROV's are not to be deployed with such tether cables in surge conditions in which trawler's usually routinely and actually operate.

In fact, it is accurate to state that when high tension is required in combination with repeated windings under tension onto a winch's drum and storage under tension on that drum such as occurs with a trawl's headline sonar cable, it is not the predominant choice of the industry to form a tension bearing data signal cable having a conductor enclosed by a strength member formed of synthetic fibers. One of the reasons for the industries continuing reliance on heavy, steel strength membered data signal cables is that many past experiments at sheathing conductors (including fiber-optic lines, copper wires, etc.) within strength members such as braided jacket layers formed of synthetic polymeric fibers have either failed in high tension applications, such as those high tension applications described above, or have failed to provide a level of resolution, that is a quality of the signal received, that is same or better as traditional constructions signal resolution.

WO 2004/020732 A2 discloses a cable having a thermoplastic core enclosed within a braided, coextruded or pultruded jacket. During fabrication the cable is heated to a temperature at which the thermoplastic core becomes liquid or semiliquid. While heated to this temperature, the cable is stretched so it becomes permanently elongated. During stretching, material of the heated thermoplastic core fill voids within the surrounding jacket. For added strength and/or stiffness, the thermoplastic core may include a central, inner strength member fiber or filament that differs from that of the thermoplastic core and is made from a metal or polymeric material. Using the metal central inner strength member to carry data signals doesn't work because during cable fabrication the metallic wire either breaks or becomes so brittle as to fail prematurely.

In attempt to remedy the long felts needs in the industry our prior application, publication No. WO 2009/142766 A2 proposes a non-steel tension bearing data signal and energy cable capable of tolerating very high loads such as those applied to a trawl's headline sonar cable while also capable of being wound on a drum or winch under high tensions and that can be wound and deployed from a winch subject to a fishing trawler's surging shocks while not impairing the cable in a short time, especially in less than twenty-four calendar months from a date of first use. Unfortunately, while these disclosures met with some acceptance with respect especially to the metallic filament formed conductors included in this disclosure's headline sonar cables, attempts to include optical fiber/fiber-optic conductors according to these teachings failed as those optical fiber conductors broke upon initial use of the cable.

In attempt to further improve the data signal resolution and thus remedy the above described remaining long felt needs in the industry with respect to headline sonar cables, several years after our initial publication referenced above we proposed further and subsequent teachings embodied in a subsequent application of ours, publication No. WO 2017/149553 A1. These teachings include teachings pertaining to increasing the signal resolution transmittable by any metallic data signal conductors and also by any fiber-optic conductors that might be used in forming the headline sonar cable. While these teachings have markedly improved the signal resolution of metallic conductors used with headline sonar cables of these teachings, attempts to use optical fiber/fiber-optic conductors with the headline sonar cables of these teachings also failed as those optical fiber conductors were also found to break upon initial use of the cables of these teachings.

Thus, it can be appreciated that a long-felt need continues to exist in the industry to improve the data signal quality and/or resolution for headline sonar cables and for other data transmission cables using fiber-optic conductors.

Objects of the Present Disclosure

An object of the present disclosure is to provide a synthetic fiber strength membered data transmission cable capable of being wound on a winch under tensions and surging shocks experienced by a fishing trawler that remains unimpaired throughout a commercially practical interval of at least 24 calendar months from a date of first use, and more especially, that has a higher signal resolution and/or signal quality transmittable via fiber-optic fibers contained in the data transmission cable in comparison to applicant's prior taught non-steel data transmission cables taught in WO 2009/142766 A2 and in WO 2017/149553 A1, and in particular has a sufficiently high quality data signal transmission and resolution so as to permit use of equipment that is capable of discerning between different fish species, juvenile and undersized fish.

Another object of the present disclosure is to provide a synthetic fiber strength membered data transmission cable capable of being wound on a winch and remaining unimpaired under tensions and surging shocks experienced by, for example, fishing trawlers and seismic vessels, particularly those having displacements exceeding 100 tons and even exceeding 3000 tons.

Another object of the present disclosure is to provide a synthetic fiber strength membered data transmission cable capable of being wound on a winch at a tension exceeding 100 kg that remains unimpaired throughout a commercially practical interval of at least 24 calendar months from a date of first use on trawlers or seismic vessels exceeding 200 tons displacement.

Another object of the present invention is to provide a non-steel data transmission cable that does not kink when relaxed.

Another object of the present disclosure is to provide a High Strength Data Transmission Cable capable of being wound on a winch under tensions, has a strength member formed preferably of synthetic fibers and is light in weight and low in recoil, that has a higher signal resolution and/or signal quality transmittable via fiber-optic fibers contained in the cable in comparison to known cables and that also optionally contains power conductors such as a coaxial cable internal the core of the High Strength Data Transmission Cable.

Disclosure

The present invention is based upon the surprising and unexpected discovery that by suspending within a flexible solid material a fiber-optic conductor that itself is formed into a helix, so as to form a core-cable created by the combination of (i) the fiber-optic conductor defining a helix; and (ii) the flexible solid material within which is suspended (and preferably completely encased) the fiber-optic conductor defining a helix, and using the core-cable as a supportive core for a (preferably braided) strength member formed of polymeric material, and, preferably where the core cable supports the natural internal cavity shape of the strength member under a tension that, for example, is sufficient to be ten percent or more of the strength member's maximal tensile force, that a surprising long-lived, high resolution high strength data transmission cable is achieved.

The present disclosure is further based upon the surprising and unexpected discovery that by enacting a production process for the high strength data transmission cable that includes a new step of providing additional fixation between a core comprising thermoplastic material and the fiber-optic conductor(s) that helix about the core, where such additional fixation is additional to any fixation obtained from the fact that the fiber-optic conductor(s) are connected to the core by being situated in helix fashion about the core, and that by providing this additional fixation prior to situating thermoplastic material around the combination of the fiber-optic conductor(s) and the core about which they helix so as to encase the fiber-optic conductor(s) within thermoplastic material and/or between the core and thermoplastic material; and subsequently forming at least a strength member jacket layer of polymeric material about the encased fiber-optic conductor(s) helixing about the core, that a high strength data transmission cable having a very high quality of signal is obtained, thus satisfying a need long felt in the industry.

Preferably, the core about which the fiber-optic conductors helix is formed of thermoplastic material, and at least has its outermost layer formed of thermoplastic material, while also preferably the thermoplastic material situated about the combination of the core and the fiber-optic conductors helixing about the core, is a thermoplastic material that forms a very strong bond with the thermoplastic material forming the core and at least with the thermoplastic material forming the outermost layer of the core, e.g. forming the layer of the core that the helixing fiber-optic conductors contact. Ideally and preferably, the bond formed is an inseparable bond. For example, the bond ideally is so strong that the thermoplastic material that is situated about the combination of the core and the fiber-optic conductors helixing about the core cannot, in a solid phase, be separated from the thermoplastic material forming the core.

Yet more preferably, the thermoplastic material situated about the combination of the core and the fiber-optic conductors helixing about the core, is a thermoplastic material that forms a very strong bond, and preferably an inseparable bond, with both (i) the thermoplastic material forming the core and at least and especially with thermoplastic material forming the outermost layer of the core; and (ii) the fiber-optic conductors and/or with the outermost layer and/or exterior of the fiber-optic conductors, such as any buffer material, insulative material other material forming the outermost layer and/or exterior layer of the fiber-optic conductors.

Thus, in one aspect the invention sets forth a high strength data transmission cable having a strength member and a core, the high strength data transmission cable comprising a length of a core-cable comprising said core as well as comprising at least one fiber-optic conductor that is disposed in a helical shape; and completely encased in a solid, flexible material. Thus, generally the at least one fiber-optic cable disposed in a helical shape is disposed as a helix around the core.

In an embodiment the high strength data transmission cable is encased within the solid, flexible material by being sandwiched and/or enclosed between: (a) a solid, flexible material layer comprising at least the surface of the core and in some embodiments the whole core from the center to its surface; and (b) a solid, flexible material layer comprising a layer that is exterior the surface of core.

The solid, flexible material layer comprising the surface of the core (or the entire core) and the solid, flexible material layer comprising the layer that is exterior the surface of core preferably are permanently bonded to one another. Thus, in some embodiments the strength of the bonding is substantially similar or higher than the tearing strength of either or both materials.

In some embodiments the solid, flexible material layer comprising at least the surface of the core and the solid, flexible material layer comprising the layer that is exterior the surface of core each comprise an identical substance and are permanently bonded to one another, meaning that in some embodiments the layer comprising at least the surface of the core layer that is exterior the surface of core are made from substantially the same or exactly the same material.

In an embodiment of the high strength data transmission cable: (i) the solid, flexible material layer comprising at least the surface of the core; (ii) the solid, flexible material layer comprising the layer that is exterior the surface of core; and (iii) an exterior most layer comprising the fiber-optical conductor are permanently bonded to one another. In some embodiments these three layers each comprise an identical substance and are permanently bonded to one another, meaning that they are in some embodiments made from substantially the same or identical material. In embodiments comprising said three layers these are preferably all bonded permanently one to another.

The solid flexible layer exterior the core (i.e. surrounding the fiber-optic cable) has a thickness measured from the exterior most edge of the fiber-optic conductor to the exterior surface of said layer which is preferably at minimum four times the diameter of the optical pipe (22, 22A) of the fiber-optic conductor, and preferably in a range from four times to two hundred times the diameter of the optical pipe of the fiber-optic conductor.

In some embodiments of the invention, the high strength data transmission cable comprises a flow shield, where the combination of the flow shield and the exterior surface of the solid, flexible layer surrounding the core conform to the interior cavity wall of the surrounding strength member of the cable, the strength member preferably being a hollow braided strength member. In some embodiments of the high strength data transmission cable the interface between the solid, flexible layer (3) surrounding the core and the surface of the core has a form that is non-conforming to the interior cavity wall of the strength member. In some such embodiments the interface between the solid, flexible layer (3) surrounding the core and the surface of the core has a form lacking convex depressions, when viewed from exterior the core (e.g. outwardly from the core).

In some embodiments the high strength data transmission cable comprises multiple fiber-optic conductors preferably each fiber-optic conductor is entirely encased within the solid, flexible material forming the surface of the core (or entire core) and the solid, flexible material forming the layer (3). Preferably no fiber-optic conductor's exterior directly contacts any other fiber-optic conductor's exterior at any point along the length of core-cable.

In another aspect, the invention sets forth a process for producing a high strength data transmission cable, the process comprising the steps of (i) situating in spiraling helical fashion at least one fiber-optic conductor about a core comprising thermoplastic material that forms at least the surface of the core;

(ii) next; situating additional thermoplastic material about the combination of the core and the at least one fiber-optic conductor that is helically disposed about core, so as to entirely encase the fiber-optic conductor within thermoplastic material;

(iii) next, permitting the thermoplastic materials to set, thereby forming a core-cable (10);

(iv) next; forming a flow shield about the core-cable;

(v) next, forming a hollow braided strength member comprising synthetic material about the core-cable sheathed by the flow shield; followed by subjecting the resultant cable to tension, and to heat sufficient to permit permanent deformation of the thermoplastic material comprising layer (3) while not causing failure of the structural integrity of layer (3), while also to permit elongating and compacting said resultant cable and the strength member comprising said resultant cable;

(vi) next, determining that a desired amount of elongation and compaction of the resultant cable and the strength member comprising said resultant cable has been achieved, followed by cooling the resultant cable to a temperature where the thermoplastic material comprising layer (3) is incapable of being permanently deformed without causing failure of the structural integrity of layer (3), thereby permanently elongating and compacting the strength member as well as the resultant cable and causing the layer (3) in combination with the flow shield to conform to the interior cavity wall of the strength member. The process for producing the high strength data transmission cable is characterized by the steps of:

a. providing a core, and preferably a core containing thermoplastic material and preferably having an exterior surface layer formed of thermoplastic material, and optionally containing any conductors and/or other elements within the core;
b. situating at least one and up to several fiber-optic conductors in helix form about the exterior of the core;
c. optionally, but most preferably, providing additional fixation between the core and the fiber-optic conductors that form a helix about the core;
d. situating additional thermoplastic material about the combination of the core and the fiber-optic conductors helixing about the core so as to encase the fiber-optic conductors between the core and the thermoplastic material;
e. forming a flow shield about the combination of the core; the fiber-optic conductors helixing about the core; and the thermoplastic material situated around the combination of the core and the fiber-optic conductors helixing about the core;
f. forming a preferably braided strength-member jacket layer of polymeric material about the flow shield and the items contained within it;
g. situating in flowable state about the strength member jacket layer a settable elastic adhesive such as multicomponent blend polyurethane; and,
h. forming a protective cover about the strength member jacket layer and the elastic adhesive substance, thus forming an improved high-strength light-weight crush-resistant high-data-resolution power-capable fiber cable of the present disclosure.

Most preferably, the core's thermoplastic material and the additional thermoplastic material are selected so that a bond formed by and between (a) a solid phase of the additional thermoplastic material; and, (b) a solid phase of the thermoplastic material forming the core and/or at least forming the exterior of the core, is so strong that the two thermoplastic materials cannot be separated. That is, they cannot be cleanly broken from one another, but any attempt to do so would result in an uneven break that fails to produce a structure having exclusively either the additional thermoplastic material and/or having exclusively the core without some portion of the additional thermoplastic material. The bond preferably is an inseparable bond. Yet more preferably, the additional thermoplastic material and the thermoplastic material of the core are the same thermoplastic material.

Yet even more preferably, the additional thermoplastic material forms a strong bond with the material forming the exterior layer of the fiber-optic conductors. Yet even more preferably, both the thermoplastic material forming the core and/or forming at least the exterior surface of the core; and the additional thermoplastic material, both form a strong bond with material forming the outermost layer of the fiber-optic conductors.

Next, and contrary to the state of the art and against the trend in the industry for power and data capable crush resistant fiber cables formed with synthetic polymer strength members, e.g. applicant's own prior art cables, and prior to the above disclosed production steps of: "g. situating in flowable state about the strength member jacket layer a settable elastic adhesive such as multicomponent blend polyurethane; and, h. forming a protective cover about the strength member jacket layer and the elastic adhesive substance", the present disclosures cable formed by the above disclosed steps (a) through (f) and lacking the protective cover about the strength member jacket layer and the adhesive layer that adheres such cover to the strength member jacket layer can now be cold stretched. E.g. stretched at a temperature that is sufficiently low that it does not cause the thermoplastic material to become molten. Tensions between fifteen to eighty percent of the strength member jacket layer's maximal tensile force are considered useful. Next, the cable can now be fitted with a protective cover, such as a braided sheath that is adhered to the strength member jacket layer with an elastic adhesive. Or, alternatively, and optionally, and also prior to the steps of: "g. situating in flowable state about the strength member jacket layer a settable elastic adhesive such as multicomponent blend polyurethane; and, h. forming a protective cover about the strength member jacket layer and the elastic adhesive substance", further and subsequent steps include heat depth stretching the cable formed by the above disclosed steps (a) through (f) and lacking the protective cover about the strength member jacket layer and the adhesive layer that adheres such cover to the strength member jacket layer, as follows:

(i). applying a first tension to the strength member jacket layer and thus by extension to all elements contained within the strength member jacket layer (the strength member jacket layer and all elements contained within it also optionally known herein as "the in-production cable");

(ii). applying a heat to the present disclosures in-production cable, where such heat is selected so as to cause thermoplastic material within the present disclosures in-production cable to reach a molten, e.g. semi-liquid, phase. Optionally, and as experimentally determined desirable or not, and contrary to the state of the art and against the trend in the industry, the heat may be selected and applied so as to cause only a portion of the core to reach a molten phase, especially so as to be sufficient to cause a portion of the core most proximal the exterior of the in-production cable to reach a molten phase while being insufficient to cause a portion of the core most proximal the longitudinal central axis of the in-production cable to reach a molten phase. This can be accomplished by regulating both the temperature as well as the time duration of exposure to heat, such as is accomplished by pulling the in-production cable through an oven where the heat is being applied, regulating both the heat, the means of applying the heat, e.g. radiant heat with or without blown air or steam heat or other, as well as the speed of travel of the rope through the oven and the length of the oven, until a recipe and/or formula is experimentally arrived at for a particular in-production cable diameter and construction that permits making molten only those portions of the thermoplastic in the cable proximal the cables exterior while not making molting/being insufficient to cause to change to a molten phase those portions of thermoplastic in the cable that are proximal the longitudinal central axis of the cable. In this way, for example, the core 1 may remain solid, while the additional thermoplastic layer 3 may reach molten phase, during rope processing.

(iii). applying a tension to the strength member jacket layer of the in-production cable sufficient to elongate the hollow braided strength member jacket layer and structures contained within the hollow braided strength member jacket layer (such as the helix shape(s) formed by optical fiber(s)) a predetermined amount that is an amount that does not cause failure of the fiber-optic conductors and that also removes constructional elongation from the strength member jacket layer while also reducing its diameter and the diameter of the in-production cable;

(iv). determining that a desired amount of elongation of, and preferably a predetermined amount of elongation of, at least, the strength member jacket layer, is reached;

(v). cooling the strength member jacket layer and elements contained within it, preferably while maintaining tension on the strength member jacket layer and thus also maintaining tension on elements contained within it, e.g. within the "in production cable", until the thermoplastic material contained within the strength member jacket layer reaches a solid phase and also so that the combination of elements contained within the strength member jacket layer have been formed to a shape that conforms and adapts to the natural form of the walls formed by the interior cavity of the hollow braided strength member, and, preferably but optionally, also so that as a result the optical conductors contained within the cooled in production cable have experienced an amount of contraction and/or reduction of their length, by about zero point five percent, or less, but it can be more;

(vi). applying any further items or substance to the exterior surface of the strength member jacket layer, such as a flowable state of Polyurethane or other elastic adhesive substance; followed by (vii). while the elastic adhesive substance is still in a flowable state (should such substance have been selected for use) forming a protective cover about the strength member jacket layer and the layer of elastic adhesive substance and/or other item(s) situated exterior the strength member jacket layer, thereby forming an Improved high-resolution synthetic fiber strength-membered data transmission cable of the present disclosure.

So formed, the high strength data transmission cable of the present disclosure provides a much higher data signal quality and/or resolution in comparison to known high strength data transmission cables, thus permitting use of equipment presently in development but unable to be used with, for example, known data transmission cables, that permits identifying fish species and distinguishing between fish sizes, thereby permitting avoiding with the fishing gear non-target fish species and juvenile and undersize fish, thus improving the health of fisheries and the marine mammals and seabirds and fishing communities that depend upon them, accomplishing goals of the present disclosure.

Possessing the preceding advantages, the disclosed non-steel high strength data transmission cable answers needs long felt in the industry.

These and other features, objects and advantages will be understood or apparent to those of ordinary skill in the art from the following detailed description of the preferred embodiment as illustrated in the various drawing figures.

BRIEF DESCRIPTION OF DRAWINGS

FIGS. 2, 3 and 4 show production step views for forming the core-cable 10 of the high strength data transmission cable in accordance with the present disclosure.

FIG. 4A is a cross sectional view taken along section line 4A of FIG. 4;

DETAILED DESCRIPTION

Figure 1:
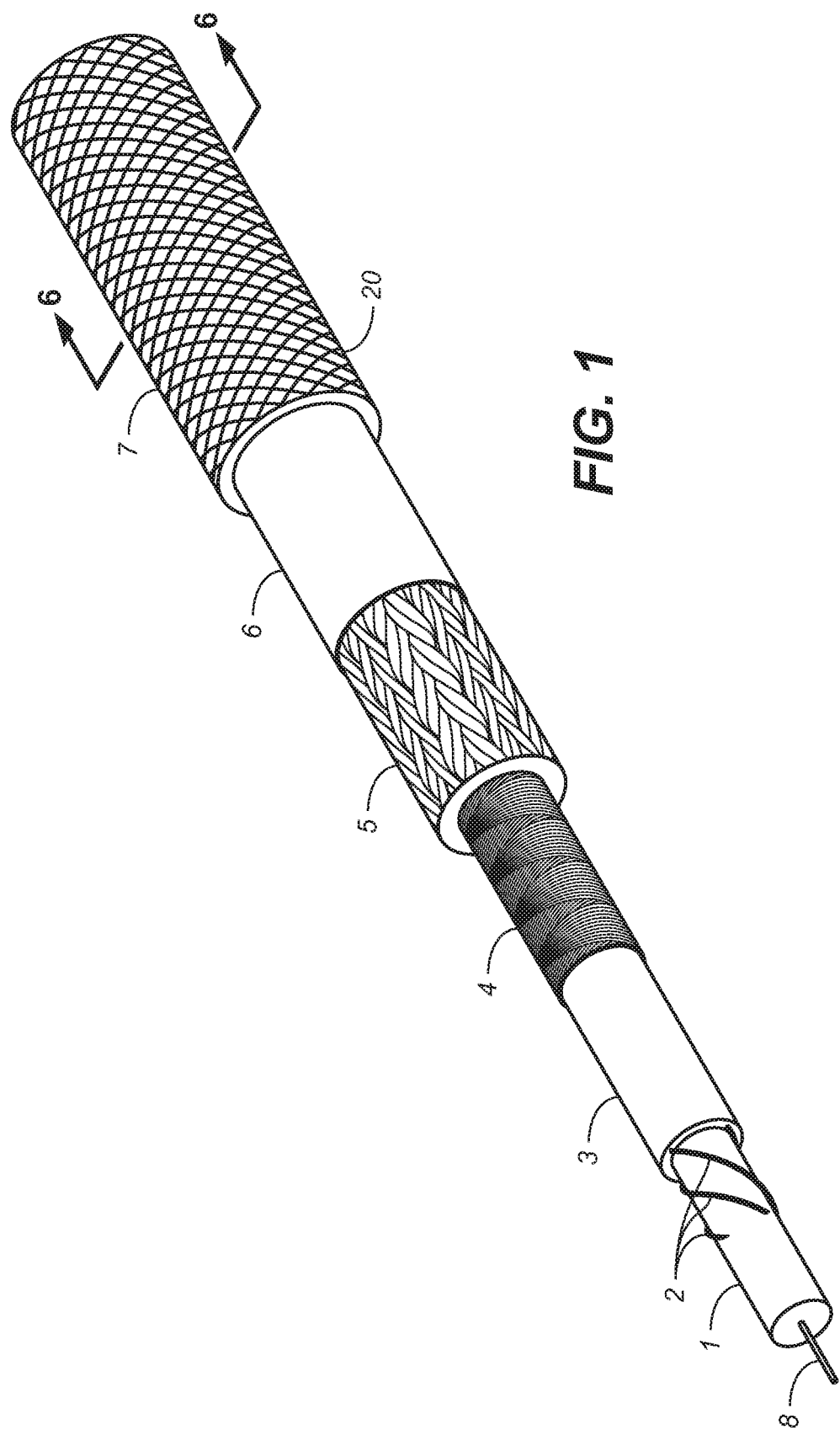
FIG. 1 is a perspective plan view of a high strength data transmission cable in accordance with the present disclosure that reveals various layers included in one embodiment thereof.
Figure 1A:
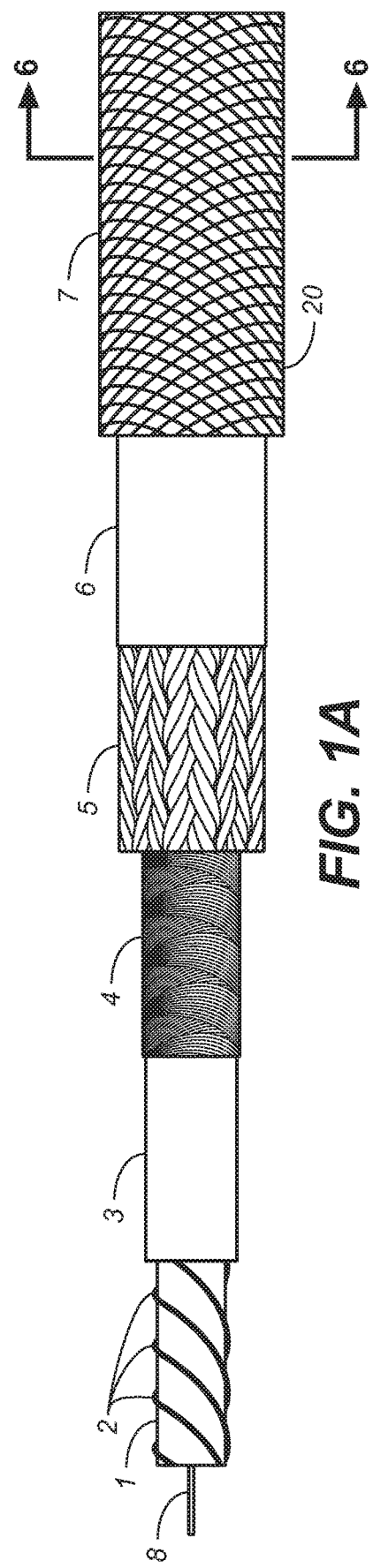
FIG. 1A is a side plan view of the high strength data transmission cable of FIG. 1, similarly revealing various layers thereof.

FIG. 1 and FIG. 1A show a high strength data transmission cable 20 of the present disclosure including: a core 1 comprising thermoplastic material, and coupled to a first strength member 8 (see also FIG. 2); at least one and preferably several fiber-optic conductors 2 helixing about the core 1 (see also FIG. 3), that can be any type of useful fiber-optic conductor, although a single mode fiber-optic conductor has surprisingly been found preferable; additional thermoplastic layer 3 encompassing the helically disposed fiber-optic conductors between layer 3 and the exterior surface of core 1 (see also FIG. 4); flow shield 4; strength member jacket layer 5; elastic adhesive layer 6; and protective outer cover 7.

The core 1 preferably is formed of thermoplastic material. However, the core 1 may include metallic and/or other conductors (not shown in FIG. 1) and/or other elements (not shown in FIG. 1) located within the core, such as a coaxial energy and/or information cable (see elements depicted by reference numerals 21, 22 and 23 of FIG. 9, FIG. 9A, FIG. 10 and FIG. 11, depicting a coaxial cable internal core 1); and/or such as a braided copper filament conductor and/or such as an electromagnetic shield, as taught in our prior publications referenced above. Whatever portion of the core 1 is not occupied by items needed for the production of and/or for the function of the high strength data transmission cable preferably is formed of thermoplastic material. Whatever construction is used for the core 1, the exterior surface layer of the core 1 is formed of thermoplastic material and has a thickness in a range of about half a millimeter to about four millimeters, preferably about one and a half millimeters to about four millimeters, prior to any stretching steps.

Preferably, for all embodiments of the present disclosures high strength data transmission cable: core 1 has a circular cross section (although, less preferably, it can have an oval or quasi oval or quasi circular or elliptical cross section); and, when core 1 has a circular cross section, the diameter of core 1 preferably ranges from thirty-two times to two hundred sixty four times; and preferably from forty times to sixty-four times, the diameter of the optical pipe of a fiber-optic conductor used in forming the present disclosures high strength data transmission cable. Such embodiments have surprisingly been shown to provide for greater resolution of the data transmitted and are contrary to the known state of the art and trend in the industry as shown by exemplary example in our prior published patent applications. When core 1 has a cross-section which is not perfectly circular, the diameter of core 1 being measured as the diameter at the largest width of the cross-section, preferably has a value within the above mentioned ranges.

Figure 2:
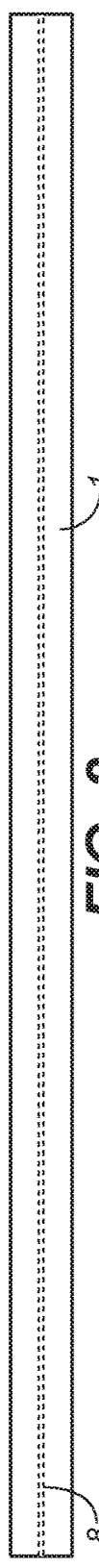
Figure 3:
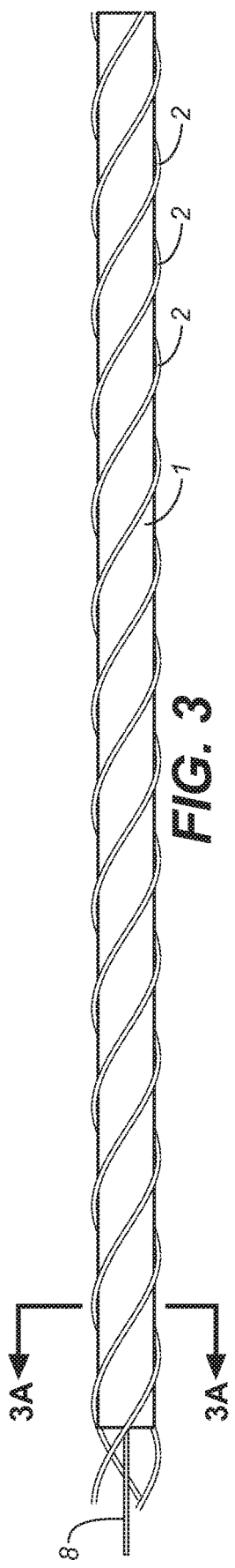

In a particular preferred embodiment of the present disclosures high strength data transmission cable, the core 1 preferably is directly coupled to the first strength member 8. This can be accomplished by forming the core 1 about the first strength member 8, such as by extruding a thermoplastic rod about a first strength member 8 (see FIG. 2), or, alternatively, such as by first extruding a thermoplastic rod to form core 1 and subsequently braiding in hollow braid fashion about the thermoplastic rod a hollow braided multifilament first strength member 8 such as can be accomplished using a conventional braiding machine. It is presently preferred that core 1 be formed about the first strength member 8, as shown in FIG. 1 and FIG. 2, and that first strength member 8 not contact the surface of core 1. It is presently preferred to use a strength member capable of retaining its integrity at temperatures up to 120 Celsius, preferably up to 200 Celsius, and especially at temperatures up to 270 Celsius, such as an Aramid filament or such as stranded polyester filaments, for forming the first strength member 8. It presently is preferred that the strength member not be formed of thermoplastic material.

Figure 9:
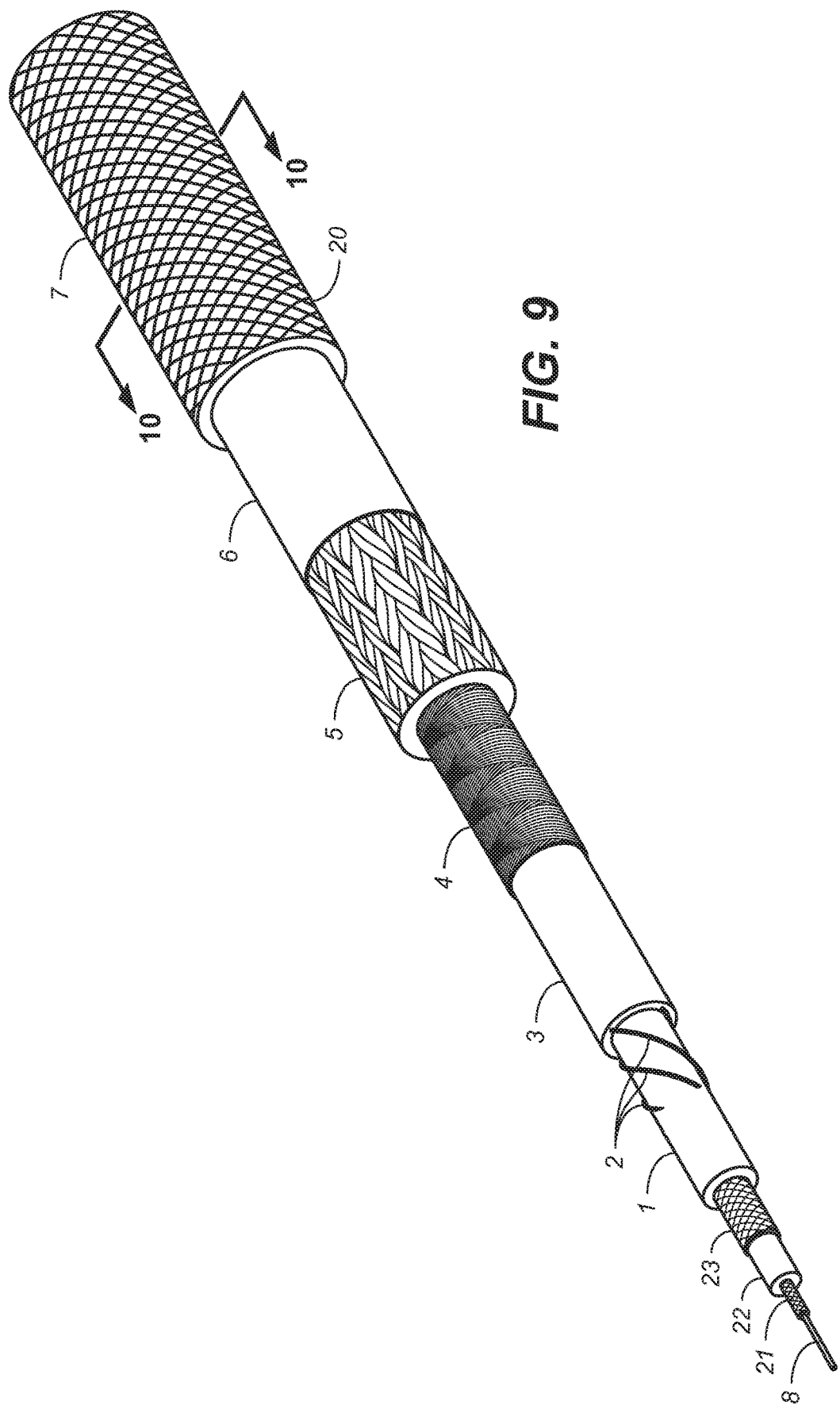
FIG. 9 and FIG. 9A are a perspective plan view and a side plan view, respectively, of an alternative embodiment of the high strength data transmission cable of the present disclosure, revealing various layers thereof, where a coaxial cable has been included within the core 1 and the core-cable 10.
Figure 9A:
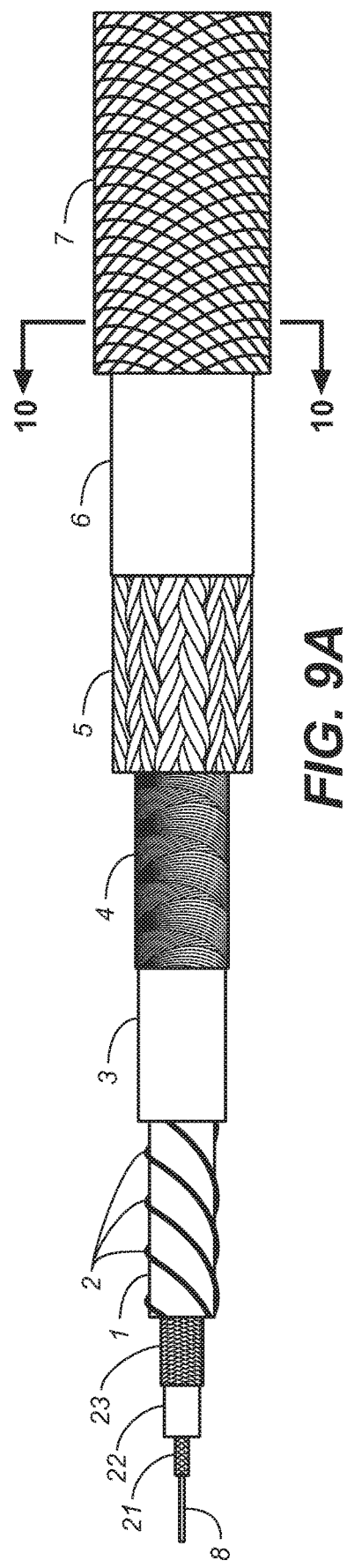
Figure 10:
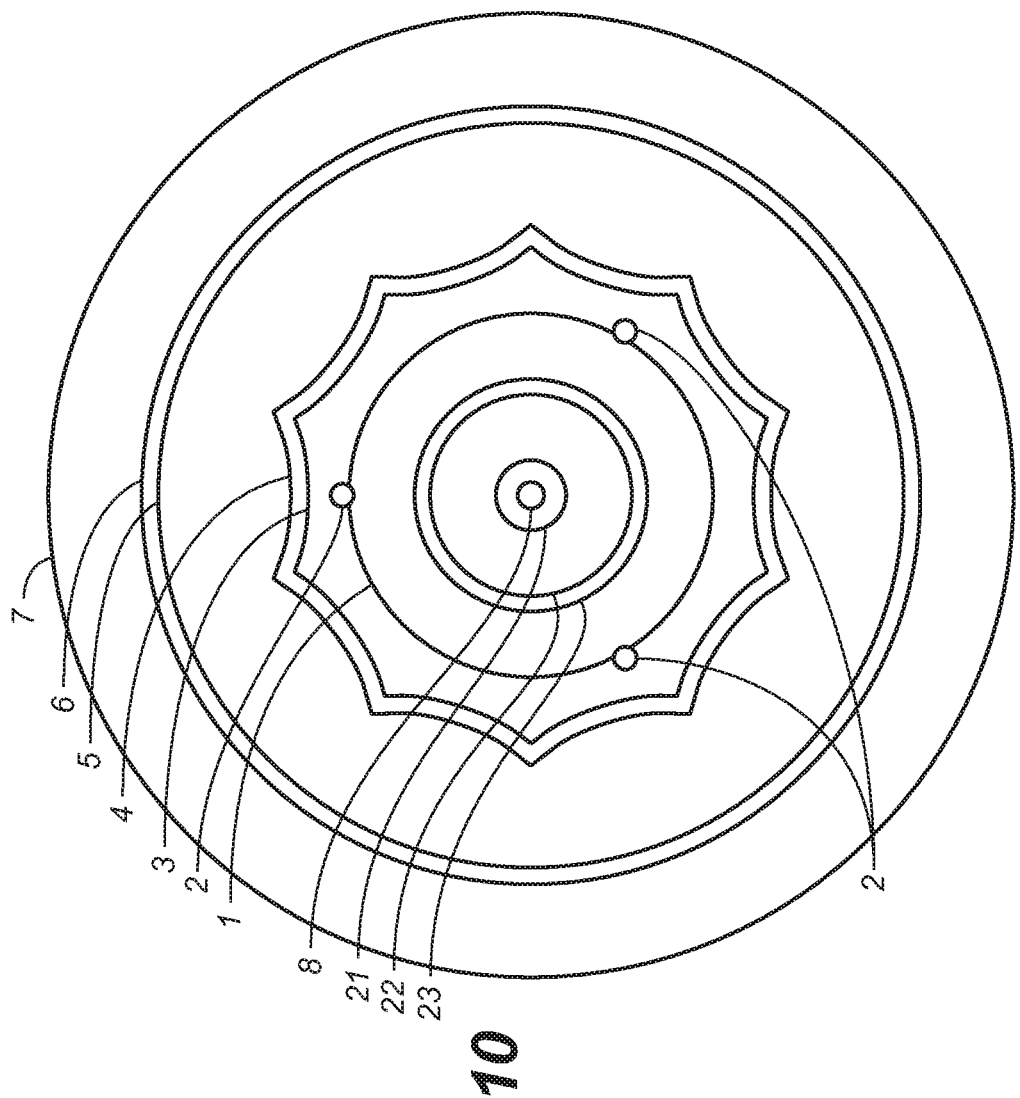
FIG. 10 is a cross sectional view of the alternative high strength data transmission cable of FIG. 9 and FIG. 9A, taken along section line 10 of FIG. 9 and FIG. 9A, showing various layers of the final assembled high strength data transmission cable 20, where the assembled final high strength data transmission cable was heat and tension stretched prior to installation of the adhesive layer 6 and final outer cover 7.
Figure 11:
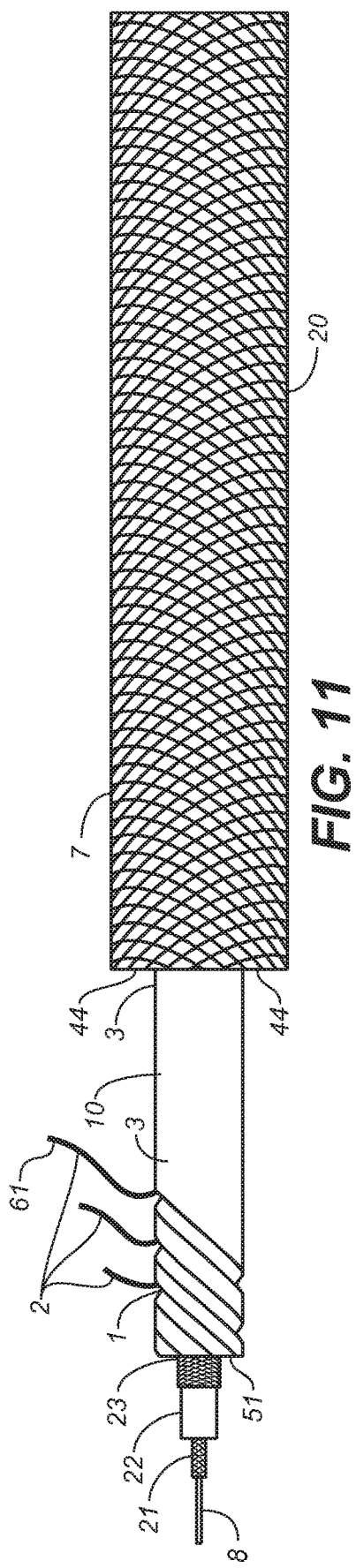
FIG. 11 is a side plan view of a high strength data transmission cable of the present disclosure, showing various layers thereof, where a length of each fiber-optic conductor 2 has been torn out of the core-cable 10, causing disruption of the layer 3 as well as of the layer 1, the material of both layer 1 and of layer 3 having adhered to the exterior buffer/insulative layer of the fiber-optic conductors with an adherence force sufficient to cause at least portions of the material of the layer 1 to detach from other material of layer 1 and remain attached to portions of the buffer/insulative layer of the fiber-optic conductor 2 during and after tearing of a portion of the fiber-optic conductor 2 from the layer 3 and thus from the core-cable 10 (thereby also forming grooves into the core-cable 10 that used to be occupied by a combination of a length of fiber-optic conductor 2 as well as portions of material forming layer 1 and forming layer 3).

However, and alternatively, in reference to FIG. 9 to FIG. 11, that show an alternate embodiment of the high strength data transmission cable of FIG. 1 and FIG. 1A where a coaxial cable assembly has been included within core 1 as indicated by elements 21, 22 and 23, when it is desired to include a metallic conductor within the core 1, then the first strength member 8 can be situated internal a braided metallic conductor 21, and the combination of the braided metallic conductor 21 and the first strength member 8 then may be directly coupled to the core 1, preferably by extruding a thermoplastic layer 22 about the combination of the braided metallic conductor 21 and the first strength member 8 so as to form a rod that defines core 1; and, further, an electromagnetic shield 23 may be formed about the exterior of the thermoplastic layer 22, such as by laying two opposing layer directions of copper filaments, where such electromagnetic shield 23 also may serve as a conductor and/or conductive loop, and then the thermoplastic layer forming the exterior of core 1 may be formed about the electromagnetic shield.

Figure 13:
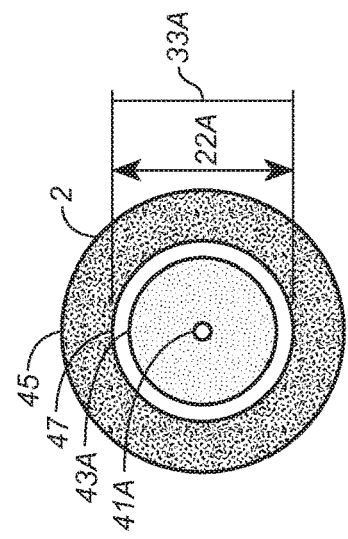
FIG. 13 is a cross section view of another type of fiber-optic conductor useful by way of example in forming the high strength data transmission cable of the present disclosure, as viewed in a plane lying perpendicular to the long axis of the fiber-optic conductor, and revealing various layers and features of the fiber-optic conductor. The fiber-optical conductor of FIG. 13 comprises similar layers and features as does the fiber-optic conductor of FIG. 12, including: core 41A; cladding 43A; and buffer 45 (the buffer 45 also is known as the "buffer layer", and/or as: the "coating"; or the "jacket"; or the "insulation), except that the fiber-optic conductor 2 of FIG. 13 additionally comprises an additional cladding layer 47 that also is known as the "outer cladding" and/or as the "outer cladding layer", therefore also cladding layer 43A also is optionally known as the "inner cladding" and/or "inner cladding layer". For purposes of the present disclosure, the "optical pipe" of the fiber-optic conductor of FIG. 13 and of any fiber-optic conductor used in forming any high strength data transmission cable of the present disclosure also is formed by the combination of the core and the cladding (which in the case of fiber-optic conductor of FIG. 13 includes the inner and outer cladding 43A and 47), as indicated by reference numeral 22A. For purposes of the present disclosure, the greatest width of any optical pipe used in any fiber-optic conductor used in forming the present disclosures high strength data transmission cable is herein known as the diameter of the optical pipe, and is derived by measuring the distance along an imaginary straight line spanning the cross section of the optical pipe at its greatest width, as indicated in FIG. 13 by imaginary straight line 33A.
Figure 12:
FIG. 12 is a cross section view of one type of fiber-optic conductor 2 useful by way of example in forming the high strength data transmission cable of the present disclosure, as viewed in a plane lying perpendicular to the long axis of the fiber-optic conductor 2, and revealing various layers and features comprising the fiber-optic conductor 2: including the core 41; the cladding 43; and the buffer 45 (the buffer 45 also is known as the "buffer layer", and/or as: the "coating"; or the "jacket"; or the "insulation). For purposes of the present disclosure, the combination of the core 41 and the cladding 43 contained in any fiber-optic conductor used in forming any embodiment of a high strength data transmission cable of the present disclosure form a unit known as the "optical pipe", indicated in FIG. 12 by reference numeral 22. For purposes of the present disclosure, the greatest width of any optical pipe used in any fiber-optic conductor used in forming the present disclosures high strength data transmission cable is herein known as the diameter of the optical pipe, and is derived by measuring the distance along an imaginary straight line spanning the cross section of the optical pipe at its greatest width, as indicated in FIG. 12 by imaginary straight line 33.

Fiber-optic conductors used in forming any high strength data transmission cable of the present disclosure preferably have a buffer layer exterior the cladding where such buffer layer is of sufficient thickness and is formed of sufficiently abrasion resistant material that it can tolerate abrasion encountered during the production process without being entirely displaced in any location from the exterior surface of the cladding, and is capable of retaining its integrity at temperatures up to 200 Celsius, and especially at temperatures up to 250 Celsius, and yet more especially at temperatures up to 270 Celsius; and, furthermore, where such buffer layer is comprised of a material that includes a blend of materials where one material of the blend is the same thermoplastic material as used in forming layers 1 and/or 3, with a polyethylene or a nylon being preferred, where a combination of silicone with a thermoplastic material presently is preferred. An example of such a buffer layer is indicated by reference numeral 45 in FIG. 12 and FIG. 13.

Figure 5:
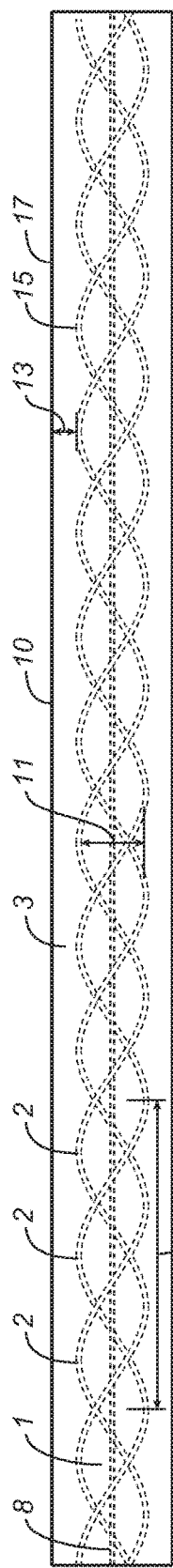
FIG. 5 shows a side plan view of the core-cable 10 of FIG. 4 of the high strength data transmission cable of FIG. 1 and FIG. 1A where the helix shaped fiber-optic conductors 2; as well as the first strength member 8, that are completely encased in thermoplastic material 1, 3, and thus also are completely encased in the core-cable 10, are shown in dashed lines, imitating an "X-ray view".

With reference to reference numeral 19 of FIG. 5, reference numeral 19 indicating the pitch of the fiber-optic conductors helixing about the core 1: the fiber-optic conductors preferably helix about the core 1 with a pitch that is in a range of 160 times to 480 times; and preferably 336 times to 480 times, the diameter of the optical pipe for at least one and preferably for all fiber-optical conductors formed into the high strength data transmission cable.

Figure 8:
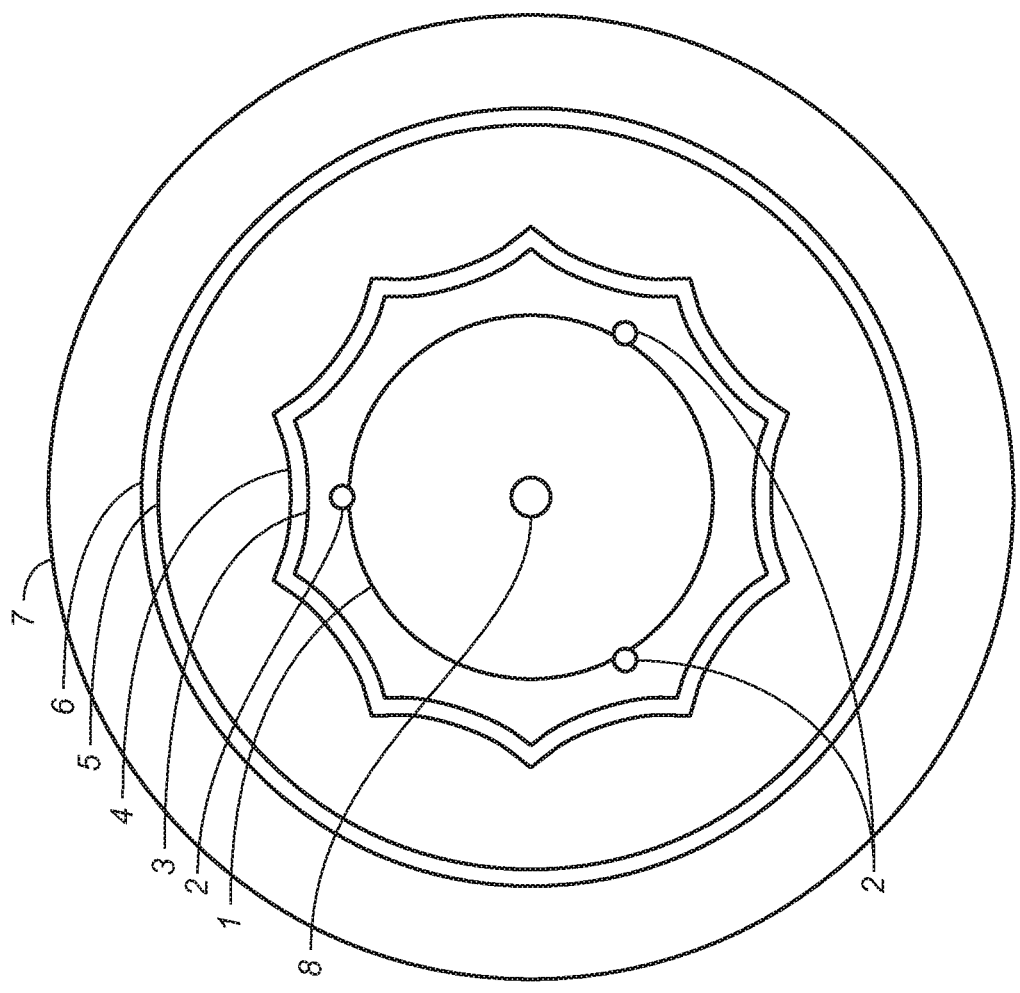
FIG. 8 is a cross sectional view of the high strength data transmission cable of FIG. 1 and FIG. 1A, also taken along section line 6 of FIG. 1 and FIG. 1A, showing various layers of the high strength data transmission cable 20, where the assembled high strength data transmission cable was heat and tension stretched prior to installation of the adhesive layer 6 and final outer cover 7.

With further reference to FIG. 5: For any embodiment of a high strength data transmission cable of the present disclosure, the additional thermoplastic layer 3 preferably is formed so as to entirely cover the outermost surfaces 15 of the fiber-optic conductors 2 with a layer 13 of thermoplastic material having a thickness selected so that after final production of the high strength data transmission cable the fiber-optic conductors remain encased in thermoplastic, even after the combination of the core-cable 10 enclosed in flow shield 4 has, optionally but preferably, been deformed through heat stretching as taught herein so as to conform to and support the internal cavity of the strength member 5 (see FIG. 8).

With further reference to FIG. 5: for any embodiment of a high strength data transmission cable of the present disclosure: Preferably, when situated around the core and the fiber-optic conductors helixing about the core, the additional thermoplastic layer 3 has a thickness measured from the exterior most edge 15 of a fiber-optic conductor to the surface 17 of layer 3 of core-cable 10 that, preferably, is at minimum four times, and can be in a range from four times to sixty-six times, the diameter of the optical pipe of that fiber-optic conductor. In other terms, for any high strength data transmission cable of the present disclosure, preferably, the thickness of that portion of additional thermoplastic layer 3 that is exterior the outermost edge 15 of the buffer layer 45 of a fiber-optic conductor forming the high strength data transmission cable has a thickness in a range of from four times to sixty-six times the diameter of the optical pipe of that fiber-optic.

The flow shield sheath 4 can be any layer that stops and/or mainly stops molten (e.g. "semi-liquid") phases of the thermoplastic material from passing through the flow shield. Preferably, the flow shield is formed by tightly braiding polyester fibers or filaments with such a dense braid construction that molten phases of the thermoplastic contained within the additional thermoplastic layer 3 as well as contained within the core 1 are stopped and/or mainly stopped from passing through the flow shield. When it is desired to enact the optional, but less preferred embodiment of the present disclosures high strength data transmission cable, by forming the high strength data transmission cable by omitting steps of heating the cable until thermoplastic material in the core 1 and/or layer 3 reaches a molten phase, that is contrary to the state of the art and against the trend in the industry, then the flow shield can be omitted and thus the flow shield is optional but not mandatory in such embodiments, that also is contrary to the state of the art and against the trend in the industry.

Figure 7:
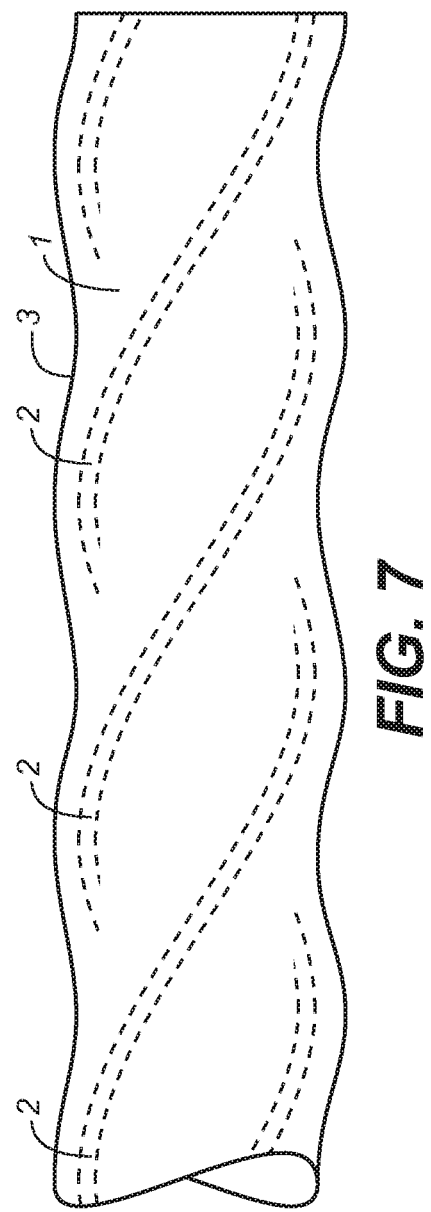
FIG. 7 is a side plan view depicting the profile of the core-cable 10 after completion of heat and tension stretching steps of the high strength data transmission cable (such steps occurring prior to installation of the outer cover 7 and adhesive layer 6), where the strength member jacket layer 5 and the flow shield layer 4 have been removed from the drawing so as to permit viewing the core-cable 10, and where portions of the optical fiber conductors 2 encased within the core 10 are shown in dashed lines.

The strength member jacket layer 5 preferably is formed of a super fiber such as HMPE, and, when the option of heat stretching the high strength data transmission cable at or near the phase change temperature of the thermoplastic is selected, preferably is formed with a twenty-four strand carrier braiding machine so as to make a twenty-four strand hollow braided strength member jacket layer 5, especially for example a "2×24" strand construction and even more preferably a "3×24" strand construction, a twenty-four strand hollow braided construction for the strength member being contrary to the state of the art and against the trend in the industry which is to use a twelve strand carrier braiding machine so as to make a twelve strand hollow-braided strength member jacket layer 5. When it is chosen to heat and tension stretch the high strength data transmission cable of the present disclosure, such step is done prior to installation of the elastic adhesive layer 6 and the outer cover 7, and is done in such a way as to result in the combination of the outer layer 3 of core-cable 10 and the flow shield 4 enclosing core-cable 10 being deformed to adapt themselves to the internal cavity of the hollow braided strength member (and also cause core-cable 10 to adopt an undulating profile when viewed in plan view, see FIG. 7), while, most preferably, not deforming the layer of thermoplastic material that is most exterior the core 1 and about which the fiber-optic conductors form their helix (see FIG. 8), which can be determined by forming the exterior layer of thermoplastic material of core 1 of a different color than the layer 3 of thermoplastic material, and determining whether or not their interface is deformed as a result of the heat and tension stretching, the goal to be to remove constructional elongation and to cause compaction of the strength member without deforming the core 1, that is contrary to the state of the art and against the trend in the industry exemplified by our prior patent applications where the fiber-optic conductors were pressed into core 1 as a result of the stretching steps and/or heat and tension stretching steps.

Elastic adhesive layer 6 preferably is a type of polyurethane, such as two or more component blended polyurethane, that preferably is applied while in a flowable state to the exterior surface of the strength member jacket layer just prior to formation of the protective cover 7 about the strength member jacket layer. As a result, the elastic adhesive layer 6 binds the strength member jacket layer to the protective cover.

Production Processes

The method for producing the present disclosures high strength data transmission cable includes steps of:

(a). Step One: providing a flexible core 1 of solid material (see FIG. 2), and preferably a core 1 coupled to a first strength member 8 that is located internal and central the core 1, as shown in FIG. 1; FIG. 1A; and FIG. 2. The core 1 comprises flexible solid thermoplastic material, and, when it contains no other elements besides the first strength member 8, preferably comprises, in addition to first strength member 8, only flexible solid thermoplastic material (first strength member 8 itself ideally formed of a non-thermoplastic material as described supra). Core 1 preferably has a shape that is of a cable and/or of a rod having a circular cross section; or a shape that is an elongate object having a circular cross section viewed in a plane that is perpendicular to the longitudinal axis of core 1. Importantly, whatever elements may optionally be included within core 1, such as for example a metallic electrical energy conductor, core 1 has an exterior surface layer formed of flexible solid thermoplastic material.

Figure 3A:
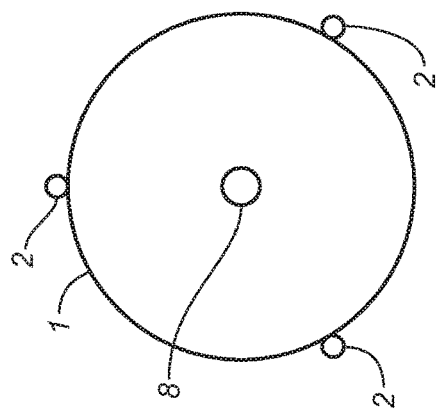
FIG. 3A is a cross sectional view taken along section line 3A of FIG. 3.

(b). Step Two: situating at least one and up to several fiber-optic conductors 2 in helixing form about the exterior of the core (see FIG. 3). This step may be accomplished by using a winding machine, such as a machine that orbits about a central point one or more bobbins and/or spools, where each spool carries a wound spooled optic fiber conductor. The flexible core 1 is passed in continuous feed fashion through the central axis of the winding machine, such as for example by being taken off a take-off reel and being wound upon a take-up reel, preferably with guides to keep the core 1 passing through the central winding point of the winding machine that is situated along the central axis of the winding machine. Care is taken to ensure that the fiber-optic conductors are unwound from the bobbins and/or spools in a direction that perpendicular or at least that is more perpendicular to the longitudinal axis of the bobbins and/or spools that it is parallel to such axis, so that not rotation is imparted to the fiber-optic conductors. The fiber-optic conductors, and thus the spools and/or bobbins, are located equidistance apart (see FIG. 3A), and the fiber-optic conductors are wound and situated on the thermoplastic surface of core 1 (see also FIG. 3A). For example, if there are four fiber-optic conductors, there are four spools and/or bobbins, each situated sixty degrees apart. If there are three fiber-optic conductors then there are likewise three spools and/or bobbins, each situated one hundred twenty degrees apart. If there are two fiber-optic conductors, then there are two spools and/or bobbins, each spaced one hundred eighty degrees apart. When only one fiber-optic conductor is used to form the high strength data transmission cable of the present disclosure, then, preferably, a strand and/or filament and/or fiber that is not a fiber-optic conductor is also situated on core 1 in helix fashion in the same location and by the same means and machinery as would have been placed a second fiber-optic conductor if it had been used, resulting in a helixing fiber-optic conductor and a helixing strand that is not a fiber-optic conductor, that also may be a strand of thermoplastic material or of, for example, polyester. Yet more preferably, in the case when only one fiber-optic conductor is used, then two strands and/or filaments and/or fibers are situated in helix fashion about core 1, where these three elements, e.g. the one fiber-optic conductor, and the two strands and/or filaments and/or fibers that are not a fiber-optic conductor, each are situated one hundred twenty degrees apart and wound about core 1 by the same machinery and methods used to wind about core 1 three fiber-optic conductors. In this case, the two strands and/or filaments and/or fibers may be a strand of thermoplastic material or of, for example, polyester.

(c). Step Three: optionally, but most preferred, providing additional fixation between the core and the fiber-optic conductors that helix about the core;

(d). Step Four: situating additional thermoplastic material 3 about the combination of core 1 and fiber-optic conductors 2 helixing about core 1, so as to encase the fiber-optic conductors between the core 1 and the thermoplastic material 3 (see FIG. 4), and allowing the additional thermoplastic material 3 to set, thereby completely encasing the helically disposed fiber-optic conductors within a solid, flexible material formed as a rod and/or cable, thus arriving at a core-cable 10 (see also FIG. 5). Polyethylene and various forms of polyethylene are suitable for the thermoplastic material of core 1 and layer 3. This step may be accomplished by positioning downstream of the above mentioned central winding point an extrusion head that extrudes flowable thermoplastic material about the combination of: the core 1 and anything coupled to the core 1, such as any fiber-optic conductors helixing about core 1; and, any strands and/or fibers and/or filaments helixing about core 1 (e.g. when only one or in some cases when only two fiber-optic conductors are used), and pulling and/or otherwise passing the "cable" formed by this combination through the extrusion head while (preferably pressure) extruding thermoplastic material to form layer 3, preferably selecting a temperature for the molten thermoplastic material as well as an extrusion pressure and time that both causes a softening (but not liquefaction) of the surface of thermoplastic exterior of core 1 while also causing sufficient pressure to force the fiber-optic conductors partially into the exterior thermoplastic surface of the exterior of core 1 so that they "seat" into the surface of core 1, followed by permitting the thermoplastic material forming layer 3 to set (while continuing the feeding of core 1), thus forming resultant core-cable 10.

To further discuss the core-cable 10: FIG. 5 shows a side plan view of what is the production phase of the core-cable 10 of the most preferred embodiment of the high strength data transmission cable in accordance with the present disclosure (e.g. the core-cable that is the result of Steps One through Four, especially mandatory steps Step One, Step Two and Step Four, and preferably including optional Step Three) and prior to enclosing the core-cable within either the flow shield or the strength member, and certainly prior to any chosen heat stretching steps) where the thermoplastic material forming core 1 as well as any thermoplastic material and/or elements forming core 1 as well as the additional thermoplastic material forming layer 3 of the core-cable have been omitted from the drawing figure, excepting the peripheral outline of the thermoplastic material forming layer 3, so as to make visible the helix shaped fiber-optic conductors 2 that are completely encased in set, solid, flexible thermoplastic material. While FIG. 5 shows three fiber-optic conductors, one often is preferable, although any needed quantity may be used. Accordingly, shown in FIG. 5 is a core-cable 10 comprising a fiber-optic conductor 2 disposed in a helix and entirely encased in a flexible solid material.

Figure 6:
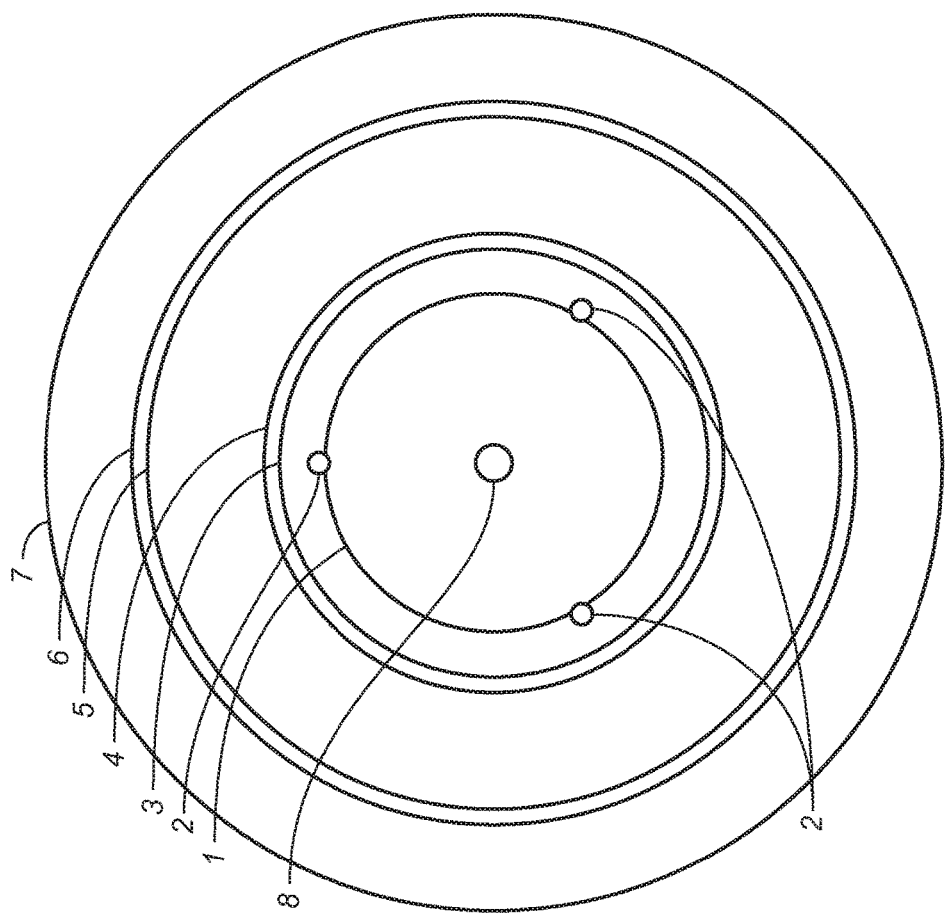
FIG. 6 is a cross sectional view taken along section line 6 of FIG. 1.

Having discussed the core-cable 10 resultant of Steps One through Four, discussion resumes of subsequent production steps:

(e). Step Five: optionally, and in the event that it should be desired to heat stretch the high strength data transmission cable after adding the strength member, a subsequent step is forming the flow shield 4 (see FIG. 6) about the core-cable 10 (preferably directly about the additional thermoplastic material forming layer 3 situated around the combination of the core 1 and the fiber-optic conductors 2 helixing about the core);

(f). Step Six: forming a preferably braided strength-member jacket layer 5 of polymeric material about the thermoplastic material forming layer 3 (see FIG. 1), or, should the optional step have been made of forming a flow shield 4 about layer 3, then the strength member jacket layer is formed about the flow shield and thus by extension all the items contained within the flow shield; while ensuring that the fiber-optic conductors remain intact, thus forming a high strength data transmission cable of the present disclosure.

A preferred construction for the strength-member jacket layer is a hollow-braided construction, preferably where there are an equal number of S and Z strands forming the hollow braid, where each main braid strand preferably, has a flattened form. Each such braid strand preferably has a width that is at minimum two times its height, especially when in the formed hollow braided strength-member jacket layer. Each such braid strand preferably also is comprised of multiple yarns. Preferably, each such braid strand comprises two yarns, where each of the yarns is not of a braided or parallel laid construction but preferably is of a twisted/laid construction, especially with a long twist and/or loose twist, according to industry standards for a loose twist for HMPE and/or other fiber chosen. Importantly and preferably, each such yarn is formed sufficiently loosely constructed, e.g. sufficiently loosely twisted/laid, that the braiding tension applied by the braiding apparatus deforms each such yarn into a flattened form, having a greater width in comparison to its height, in the final produced hollow braided strength-member jacket layer. In this way, the braid strands adopt a flattened form having an aspect ratio greater than two to one. That is to say, because there are at minimum two yarns forming each braid strand forming the strength-member jacket layer, and because each such yarn has a similar height and width as other such yarns forming the single braid strand, and because each such yarn exhibits a greater width in comparison to its height after the braiding process, the final braid strand that is formed of the at minimum two yarns must by extension have and/or define a flattened form having a greater width in comparison to its height and where its width is greater than and/or more than two times its height.

Contrary to the state of the art and against the trend in the industry, the high strength data transmission cable of the present disclosure may be used at the state it is in at Step Six above, preferably after applying a protective cover that is adhered to the strength member with an elastic adhesive layer. However, this is not preferable. Most preferably, and contrary to the state of the art and against the trend of the industry, the high strength data transmission cable formed by the methods as taught above in Steps One through Six (and lacking the adhesive layer 6 and outer cover 7) is further processed with steps of applying to the high strength data transmission cable heat selected so as to be sufficient to, preferably, allow for deformation of the thermoplastic layer 3 without causing a change to the phase of the thermoplastic material comprising core 1; and yet more preferably, and also contrary to the state of the art and against the trend of the industry, also without causing a change to the phase of the thermoplastic material comprising layer 3 and/or the high strength data transmission cable (e.g. so as to preclude said thermoplastic from changing phase from solid phase to a molten phase and/or liquid phase), combined with steps of stretching the cable a predetermined amount so as to permanently elongate and permanently compact the strength member jacket layer and the core-cable 10 especially so as to reducing both its diameter as well as the diameter and/or average thickness of the entire the high strength data transmission cable (lacking its adhesive layer 6 and outer cover 7), followed by cooling the high strength data transmission cable (lacking its adhesive layer 6 and outer cover 7) preferably while maintaining a sufficient tension on the cable so as to maintain its elongation and compaction, so that the combination of the outer portion of thermoplastic layer 3 combined with the flow shield 4 adapt a form that conforms to and supports the natural interior cavity wall surface of the hollow braided strength member, while retaining the predetermined amount of elongation and compaction so as to permanently elongate and permanently compact and permanently reduce the diameter of the cable. Contrary to the state of the art and against the trend in the industry, as exemplified by our own prior patent applications, the amount of heat, tension, and time in one preferred embodiment preferably is selected so as to cause the combination of the thermoplastic layer 3 and the flow shield 4 to deform so as to adapt to the natural shape of the interior cavity wall of the hollow braided strength member 5 while, most preferably: (i) not displacing the fiber-optic conductors 2; (ii) precluding the fiber-optic conductors 2 from displacing the material of core 1 from its position prior to the heating and stretching steps in comparison to its position after the heating and stretching steps; and, (iii) precluding the fiber-optic conductors from becoming intertwined with core 1 in comparison to their position relative to core 1 prior to the heating and stretching steps.

The next step in the production of the high strength data transmission cable can then be covering the strength member jacket layer with the protective cover 7 that, preferably, is adhered to the strength member jacket layer by the elastic adhesive layer 6.

So formed, the high strength data transmission cable of the present disclosure provides a much higher data signal quality and/or resolution in comparison to known high strength data transmission cables, thus permitting use of equipment presently in development but unable to be used with known high strength data transmission cables, that permits identifying fish species and distinguishing between fish sizes, thereby permitting avoiding with the fishing gear non-target fish species and juvenile and undersize fish, thus improving the health of fisheries and the marine mammals and seabirds and fishing communities that depend upon them, accomplishing goals of the present disclosure.

It is surprising and unexpected that by combining steps of, firstly: providing additional fixation between the core and the optic fibers helixing around the core, that is fixation beyond what fixation is obtained by helixing the optic fibers around the core 1, with steps of, secondly, and subsequently, situating the additional thermoplastic material 3 so as to completely encase the helixing optic fibers 2 within thermoplastic material, where the thermoplastic material of the core 1 also forms the surface of the core 1 and is compatible with and forms a tight and preferably inseparable bond with the thermoplastic material used to form additional thermoplastic material layer 3, and preferably is the same material as the thermoplastic material of layer 3, followed by permitting the thermoplastic of layer 3 to set and/or cool, thus forming the core-cable 10, followed by forming the polymeric strength member jacket layer, preferably of HMPE fibers around layer 3 (and any optional flow shield), that even without heat stretching with temperatures sufficient to cause the thermoplastic of either or both core 1 and layer 3 to reach a molten phase, that a superior signal resolution transmitting high resolution high strength data transmission cable is formed.

The key step of providing additional fixation between the core 1 and the fiber-optic conductors that helix about the core 1 can be accomplished in any suitable fashion that causes the fiber-optic conductors to resist sliding along the core 1, and especially in any suitable fashion that stops the fiber-optic conductor from sliding along the core 1 and/or that maintains the originally formed helix form of the fiber-optic conductors so that the helix form of the fiber-optic conductors is not altered during further processing steps including but not limited to the step of situating the additional thermoplastic material 3 about the fiber-optic conductors and the core 1 so as to completely encase the fiber-optic conductors within thermoplastic material.

In other terms, the fixation between the fiber-optic conductors and the core about which they are situated is increased, so as to provide a resistance to sliding along the core and/or to alteration of the helix shape of the fiber-optic conductors that is greater than is provided by the mere fact the fiber-optic conductors are situated in helix fashion about the core. Examples include:

1. situating a tacky substance such as an adhesive substance on the exterior surface of the core prior to wrapping the fiber-optic conductors about the core in helix fashion. The tacky substance could be situated by passing the core through a bath of such tacky substance that does not dry too quickly, or, by spraying or rolling or brushing such substance onto the core. The substance should be compatible with molten phases of the thermoplastic selected for the thermoplastic core and for the additional thermoplastic material forming the layer 3.
2. taping the fiber-optic conductors into place onto the core about which they helix, such as by binding the fiber-optic conductors into place with two-way tape.
3. heating the fiber-optic conductors prior to helixing them about the core so that the combination of their temperature and the tension on the fiber-optic conductors while helixing them onto the core cause the fiber-optic conductors to displace some of the material on the surface of the core and form a depressed track such as a groove track on the surface of the core within which lie at least a portion of the width of the helixed fiber-optic conductors.
4. heating the core or at least the surface of the core prior to helixing the fiber-optic conductors about the core so that the combination of the heat and the tension on the fiber-optic conductors while helixing them onto the core cause the fiber-optic conductors to displace some of the material on the surface of the core and form a depressed track such as a groove track on the surface of the core within which lie at least a portion of the width of each fiber-optic conductor.
5. spraying or otherwise situating an adhesive substance onto the fiber-optic conductors prior to helixing them about the core so that the fiber-optic conductors become adhered to the core and resist moving along the length of the core.
6. spraying or otherwise situating an adhesive substance onto the combination of the fiber-optic conductors and the core after helixing the fiber-optic conductors about the core so that the fiber-optic conductors become adhered to the core and resist moving along the length of the core.
7. as presently preferred, the method of providing additional fixation between the core and the fiber-optic conductors helixing about the core is to pass the core that already has the fiber-optic conductors situated about it in helix form through a heating element that uses heat, such as radiant heat, at a temperature and exposure duration sufficient to cause excitement of the (preferably thermoplastic) surface of the core, followed by permitting the combination of the core and the fiber-optic conductors to reach a cooler temperature than it reached within the heating element, and especially a temperature at which the thermoplastic is in a solid phase, followed by situating the additional thermoplastic material about the combination of the core and the fiber-optic conductors helixing about the core.

After the step of providing additional fixation between the fiber-optic conductors helixing about the core and the core has been accomplished, the step of situating the additional thermoplastic material forming layer 3 about the combination of the core 1 and the fiber-optic conductors helixing about the core preferably is enacted. To accomplish this step, it has surprisingly and unexpectedly been discovered that it is preferable to use a type of extrusion known as pressure extrusion. After the additional thermoplastic material forming layer 3 has been situated so as to result in completely encasing the fiber-optic conductors within the thermoplastic of layer 3 with the thermoplastic of at least the surface of the core 1, the next step is to form the flow shield about the thermoplastic layer 3, followed by the subsequent production steps taught supra for forming the strength member jacket layer, the elastic adhesive layer and the protective cover.

Alternative Core Embodiments

Figure 14:
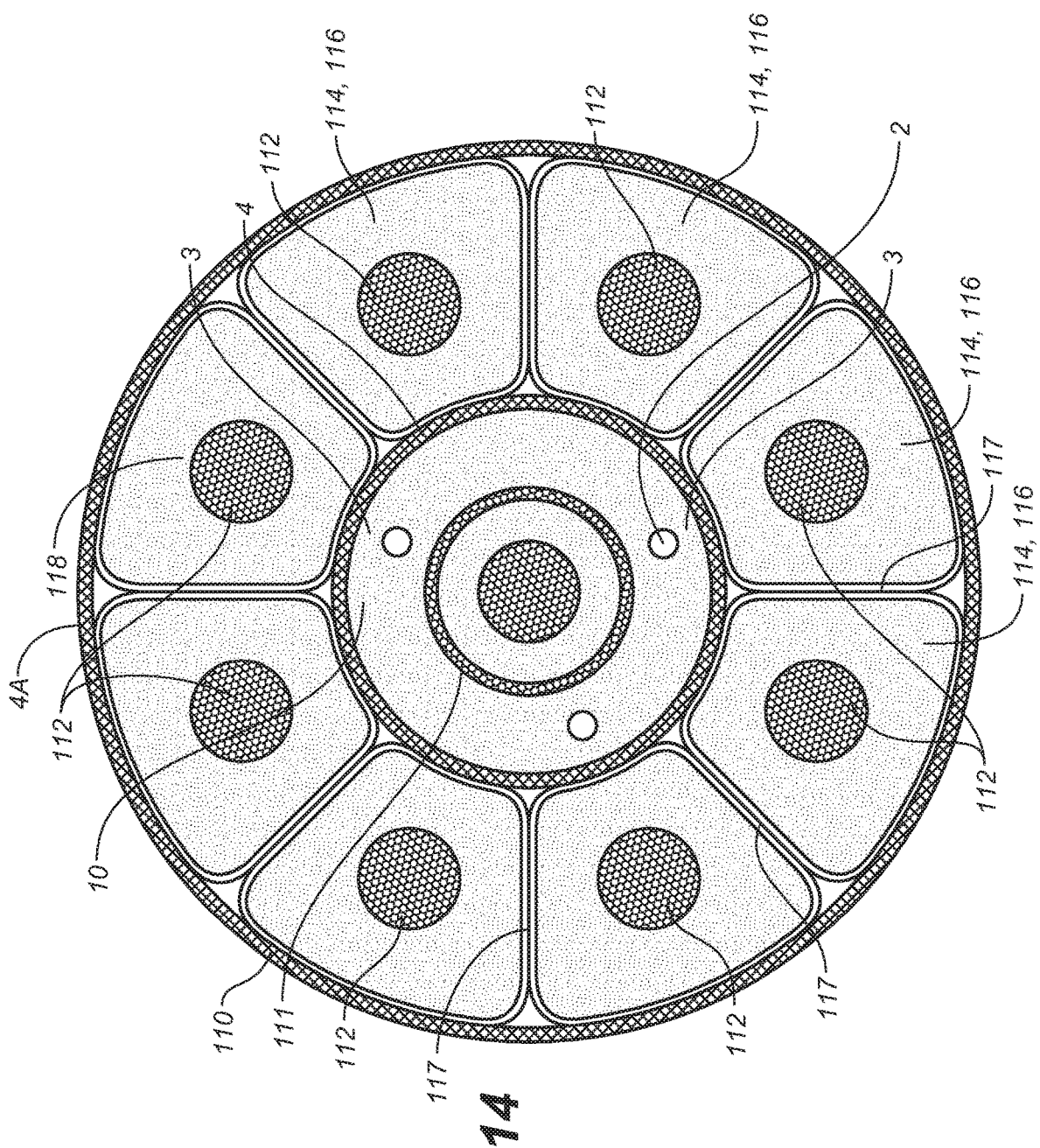
FIG. 14 shows a perspective cross sectional view of an alternative core-cable of the present disclosure taken in a plane lying perpendicular to the long axis of the alternative core-cable.

FIG. 14 shows a perspective cross sectional view of an alternative core-cable 110 of the present disclosure taken in a plane perpendicular to the long axis of the alternative core-cable 110. As shown, alternative core-cable 110 includes a variant of core-cable 10 that includes a coaxial cable 111 contained within core-cable 10, and additionally includes several additional conductors 112 that are encased within a rigid material 114, preferably a rigid thermoplastic material, that preferably is a same thermoplastic as that forming layer 3 of core-cable 10. As shown, the several additional conductors 112 are situated external core-cable 10. Most preferably, flow shield 4 has been formed about and sheaths core-cable 10, and most preferably the several additional conductors 112 are situated both external core-cable 10 as well as external the flow shield 4 that sheaths core-cable 10. The several additional conductors 112 preferably are parallel laid about core-cable 10, but may be twisted.

A presently preferred method for forming alternative core-cable 110 includes steps of:
A) providing a finished core-cable 10 produced as described supra and sheathed within flow shield 4;
B) providing several rods 116 where each rod comprises a conductor 112 encased in the rigid material 114 that preferably is the same thermoplastic material as forming layer 3, and where each rod 116 itself is sheathed within a flow shield 117, where the flow shield 117 preferably is formed of tightly braided polyester fibers and/or filaments that preferably are braided in hollow braided fashion, but also can be any layer that stops and/or mainly stops molten (e.g. "semi-liquid") phases of the thermoplastic material from passing through the flow shield;
C) situating a desired quantity of the rods 116, preferably in parallel lay fashion, about the core-cable 10, thereby forming alternative core-cable 110; and
D) situating a flow-shield 4A about the core-cable 110, where the flow shield 4A preferably is formed of tightly braided polyester fibers and/or filaments that preferably are braided in hollow braided fashion, but also can be any layer that stops and/or mainly stops molten (e.g. "semi-liquid") phases of the thermoplastic material from passing through the flow shield.

While the rods 116 may have any cross sectional shape, it presently is preferred that the rods 116 themselves are formed with and thus have a tapered cross sectional shape 118 (viewed in a plane perpendicular to the long dimension of any such rod 116), such as for example a truncated wedge, so as to facilitate their position in parallel lay fashion about core-cable 10.

Preferably, each conductor 112 is attached to a strength member (not shown) prior to being enclosed within a sheath and/or other layer of thermoplastic material, such as by being attached to a fiber and/or filament of HMPE or Aramid, such as by being formed of hollow braided copper and/or other metallic filaments about the strength member, where such strength member preferably has a higher softening point and/or degeneration temperature in comparison to the rigid material 114

After the flow shield 4A has been formed about the exterior of the alternative core-cable 110, then the remainder of the production processes as taught above that occur after formation of the flow shield 4 for core-cable 10 are enacted in like fashion for alternative core cable 110, so as to arrive at an alternative variant of the present disclosures cable that may, for example, be used as a kit rope to connect floating vessels to kites that are used to provide sail power to such vessels.

Methods for Use

With reference to FIG. 11: in order to use the present disclosures high strength data transmission cable it must be connected to an interrogator or other equipment, such as the sonar, for which it is necessary to expose the fiber-optic connectors. This preferably may be accomplished by, firstly, removing portions of the cover 7, adhesive layer 6, strength member 5 and any flow shield 4, so as to result in the core-cable 10 extending and/or protruding outward from a surface 44 formed by the cut edges of the cover, adhesive layer, strength member and flow shield; secondly, by heating the outer surface of layer 3 of the protruding portion of the core-cable ten (preferably heating its most distal end 51), as can for example be accomplished by directing a stream of heated air from an air gun at a certain fiber-optic conductor visible through the preferably translucent thermoplastic layer 3 forming the exterior surface of core-cable 10 for a sufficient duration of time so as to soften the thermoplastic material directly contacting the selected certain fiber-optic conductor; followed by digging the fiber-optic conductor out of the layer 3, such as may be accomplished by probing alongside it with sharp nosed pliers or tweezers, then grabbing the fiber-optic conductor at its distal end 61; followed by gently tearing the selected certain fiber-optic conductor outward from the softened thermoplastic layer 3 of core-cable 10; followed by pausing and heating the next region of thermoplastic layer 3 of core-cable 10 that is exterior the remaining encased portions of the selected certain fiber-optic conductor; followed by continuing to tear out of core-cable 10 the selected certain fiber-optic conductor until sufficient length of such fiber-optic conductor has been exposed and withdrawn from core-cable 10 to permit its being spliced to another fiber-optic conductor that couples the fiber-optic conductor forming the high strength data transmission cable to other fiber-optic conductors connecting to other equipment. When the data transmission cable also includes a coaxial cable or energy conductor, such also is extended from the core-cable 10 as shown in FIG. 11 to make it accessible for connection to other equipment.

INDUSTRIAL APPLICABILITY

The data transmission cable of the present disclosure may be used as a headline sonar cable and also may also be used to connect to and communicate with and, when a metallic power conductor 21 is included, provide power to sonar units located at other regions of the trawl in addition to the headline, and can for example serve as a sonar cable for sonar units mounted on the trawl's midsection, bag or belly/codend. The data transmission cable also can also be deployed from a trawler's main warp drums and serve a double purpose, e.g. as a trawler warp as well as a headline sonar cable, and thus for example communicate with a headline sonar or other device in the fishing gear through a trawler warp rather than through a dedicated headline sonar cable.

The data transmission cable of the present disclosure also is able to serve as a high strength data cable for trawler warps, and thus for example communicate with a headline sonar or other device in the fishing gear through a trawler warp rather than through a dedicated improved high-resolution power-capable crush resistant fiber cable, and also that is capable of being used as a towing warp, a deep sea winch line, a crane rope, a seismic line, a deep sea mooring line, a well bore line, an ROV tether or ROV line, a superwide for seismic surveillance, or as a load bearing data and/or energy cable, as a lead-in cable for towed seismic surveillance arrays, and/or energy cable. When used as a well bore line and/or well bore cable, it is anticipated useful to make the final outer cover of laid steel wire so as to armor the cable. However, in most other applications it is anticipated that the braided cover already disclosed supra is most useful. When used as a seismic Superwide or as a crane rope, or in any application requiring heat tolerance, including a well bore cable, it is anticipated useful that the strength member shall be formed of a hollow braided construction using a 24 strand construction, that is contrary to the state of the art and against the trend in the industry, where most useful is anticipated to be a 2×24 strand construction, or, even more preferably, a 3×24 strand construction, where each of the 24 strands is formed of an Aramid strand that is ensheathed within a HMPE or PTFE or Polyester sheath, and then those strands are braided together into the hollow braided 24 strand constructed strength member, that is preferably, at least a 2×24 strand or a 3×24 strand construction. When used in any application requiring any of heat tolerance, heat detection, elongation detection, or break detection, or detection of a region of the cable responsible for failure of any of the cable's ability to transmit data and/or energy, it is anticipated useful that the improved high-strength light-weight crush-resistant high-data-resolution power-capable fiber cable of the present disclosure comprise for its optical fibers those selected from a type capable of being used with interrogators that read and interpret Brillouin scattering and/or Raman backscattering wavelengths, and specifically with optical fibers capable of transmitting accurately interpretable Brillouin scattering wavelengths and/or Raman backscattering wavelengths, so as to permit monitoring the elongation and/or heat of the optical fibers at any region along the length of the optical. Thus, by transmitting light through the optical fibers in such a fashion that permits reading Brillouin scattering and/or Raman backscattering, and interpreting the Brillouin and/or Raman wavelengths with a suitable interrogator, the elongation and/or heat at specific locations along the optical fiber being monitored may be determined and thus the elongation of the cable may be determined at specific locations along the cable; and thus the elongation of the cable's strength member as well as its temperature may be determined at specific locations along the length of the cable; and thus the integrity of the cable's strength member is able to be determined and a determination made as to whether or not the cable is suitable for continued use in a particular application or is better retired from that application and replaced. Importantly, prior attempts at using Brillouin scattering wavelengths and/or Raman backscattering wavelengths monitor the elongation and/or heat of the optical fibers at any region along the length of the optical fibers and/or cable containing the optical fibers have failed, and none of the art has proposed the construction and method of the data cable of the present disclosure. Importantly, it has been the long held belief in the industry and the trend in the industry to minimize bending of fiber optic conductors contained within cables of any type, including but not limited to yachting cables, including when using such fiber optic conductors to monitor heat and or elongation of both the fiber optic conductors and by extension of the cables containing them. It is contrary to the state of the art and against the trend and commonly held views in the industry that a fiber optic conductor formed into a helical shape and used to form the core of a cable in the manner and construction as taught herein is capable of transmitting high resolution data signals. The fact that the present invention's cable functions this way is contrary to the widely held beliefs in the industry.

Thus, present invention also is based upon the surprising and unexpected discovery that by forming a data cable with process steps including:

suspending within a flexible solid material at least one and preferably two fiber optic conductors defining a helix (or alternately defining a double helix; or, in the case of three or more fiber optic conductors defining other helix forms), so as to form a core-cable created by the combination of (i) the fiber-optic conductors defining a helix (and/or double helix or other helix); and (ii) the flexible solid material within which is suspended (and preferably completely encased) the fiber-optic conductors defining a helix, and using the core-cable as a supportive core for a (preferably braided) strength member formed of polymeric material, and, preferably where the core cable supports the natural internal cavity shape of the strength, that the temperature and the elongation of the cable may be monitored by further steps of:

a) selecting fiber optic conductors capable of transmitting Brillouin scattering and/or Raman backscattering wavelengths;

b) transmitting light through the optical fibers in such a fashion that permits reading Brillouin scattering and/or Raman backscattering wavelengths;

c) interpreting the Brillouin and/or Raman wavelengths with a suitable interrogator so as to determine the elongation and/or heat at specific locations along the optical fiber or fibers being monitored;

d) correlating the specific locations along the length of the optical fiber or fibers being monitors to specific locations along the length of the data cable containing the optical fiber or fibers; and corresponding to the specific locations along the length of the optical fiber or fibers being monitored; thus determining the elongation of the cable's strength member as well as its temperature at said specific locations along the length of the cable.

Next, in or to determine the integrity of the cable's strength member, the next step is correlating known elongation and heat values for the cables strength member with data points indicating that the strength member either is safe to use or must be replaced.

Alternatively, but less desirably, it is anticipated useful that the cable of the present disclosure comprise for its optical fibers Fiber Bragg Grating optic fibers, where there are multiple different patterns of Bragg Grating in a single fiber, corresponding to differing locations along the length of an optic fiber, and reflecting a wavelength and/or wavelengths that differ from some or all or most of the other Bragg Grating patterns at other locations along the length of the optic fiber and thus by extension along the length of the cable. To dispose a Fiber Bragg Grating optic fiber in a helix construction and suspend and/or encase such in a rigid material in a load bearing cable is contrary to the state of the art and against the trend in the industry and surprisingly allows useful monitoring of heat and elongation and strain using otherwise known methods.

Although the present disclosure has been described in terms of the presently preferred embodiment, it is to be understood that such disclosure is purely illustrative and is not to be interpreted as limiting. Consequently, without departing from the spirit and scope of the disclosure, various alterations, modifications and/or alternative applications of the disclosure are, no doubt, able to be understood by those ordinarily skilled in the art upon having read the preceding disclosure. Accordingly, it is intended that the following claims be interpreted as encompassing all alterations, modifications or alternative applications as fall within the true spirit and scope of the disclosure.

The invention claimed is:

1. A process for producing a data transmission cable, the process including steps of:

(i) situating in spiraling helical fashion at least one fiber-optic conductor (2) about a core (1) comprising thermoplastic material forming a surface of core (1);

(ii) next, situating additional thermoplastic material (3) about a combination of the core (1) and the at least one fiber-optic conductor (2) that is helically disposed about the core (1), so as to entirely encase the fiber-optic conductor within thermoplastic material;

(iii) next, permitting the thermoplastic materials to set, thereby forming a core-cable (10);

(iv) next, forming a flow shield (4) about the core-cable (10);

(v) next, forming a hollow braided strength member comprising synthetic material about the core-cable sheathed by the flow shield; followed by subjecting the resultant cable to tension and to heat sufficient to permit permanently deforming the thermoplastic material comprising a layer (3) while not destroying the structural integrity of the layer (3), while also to permit elongating and compacting said resultant cable and the strength member comprising said resultant cable; and (vi) next, determining that a desired amount of elongation and compaction of the resultant cable and the strength member comprising said resultant cable has been achieved, followed by cooling the resultant cable to an ambient temperature while maintaining tension on the cable;

wherein the process further comprises the step of:

(vii) providing additional fixation between the core (1) and the at least one fiber-optic conductor (2) helically disposed about the core (1), the additional fixation being additional to a fixation that is obtained by helically disposing the at least one fiber-optic conductor (2) about the core (1), the additional fixation being provided prior to step (ii) so that the combination of the core (1) and the at least one fiber-optic conductor (2) that is helically disposed about the core (1) remains uncased prior to step (ii).

2. The process of claim 1, further including selecting a temperature for heating the thermoplastic layer (3) that is a temperature that permits deforming the thermoplastic layer (3) while not causing a phase change of the thermoplastic material comprising layer (3).

3. The process of claim 1, further including selecting a temperature for heating the thermoplastic layer (3) that is a temperature that permits deforming the thermoplastic layer (3) while retaining the thermoplastic material (3) in a solid phase.

4. The process of claim 1, wherein the at least one fiber-optic conductor (2) comprises a plurality of fiber-optic conductors (2).

5. The process of claim 1, wherein the step of providing the additional fixation comprises situating a tacky substance on an exterior surface of the core (1) prior to situating the at least one fiber-optic conductor (2) about the core (1) so that the at least one fiber-optic conductor (2) is adhered to the core (1) when situated thereabout.

6. The process of claim 1, wherein the step of providing the additional fixation comprises taping the at least one fiber-optic conductor (2) that is helically disposed about the core (1) to the core (1).

7. The process of claim 1, wherein the step of providing the additional fixation comprises heating the core (1) and/or the at least one fiber-optic conductor (2) prior to situating the at least one fiber-optic conductor (2) about the core (1), the heated core (1) and/or at least one fiber-optic conductor (2) causing the at least one fiber-optic conductor (2) to form at least one depressed track in the core (1) as the at least one fiber-optic conductor (2) is situated about the core (1).

8. The process of claim 1, wherein the step of providing the additional fixation comprises applying an adhesive substance to the core (1) and or the at least one fiber-optic conductor (2) prior to situating the at least one fiber-optic conductor (2) about the core (1) so that the at least one fiber-optic conductor (2) is adhered to the core (1) when situated thereabout.

9. The process of claim 1, wherein the step of providing the additional fixation comprises heating the combination of the core (1) and the at least one fiber-optic conductor (2) that is helically disposed about the core (1) to a temperature at which the thermoplastic material of the core is deformable, and then permitting the combination of the core (1) and the at least one fiber-optic conductor (2) that is helically disposed about the core (1) to cool.

10. The process of claim 1, further including:

(viii) following step (vi), cooling the strength member (5) and elements contained within it so that the thermoplastic material contained within the strength member (5) reaches a solid phase;

(ix) next, applying an elastic adhesive substance (6) to an exterior surface of the strength member (5); and (x) next, forming a protective cover (7) about the strength member (5) and the elastic adhesive substance (6) so that the protective cover (7) is adhered to the strength member (5) via the elastic adhesive substance (6).

* * * * *